US009818150B2

(12) United States Patent
Rhoads et al.

(10) Patent No.: US 9,818,150 B2
(45) Date of Patent: Nov. 14, 2017

(54) IMAGERY AND ANNOTATIONS

(71) Applicant: Digimarc Corporation, Beaverton, OR (US)

(72) Inventors: Geoffrey B. Rhoads, West Linn, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 795 days.

(21) Appl. No.: 14/152,925

(22) Filed: Jan. 10, 2014

(65) Prior Publication Data

US 2014/0304122 A1    Oct. 9, 2014

Related U.S. Application Data

(60) Provisional application No. 61/809,254, filed on Apr. 5, 2013, provisional application No. 61/818,839, filed on May 2, 2013.

(51) Int. Cl.
*G09G 5/14* (2006.01)
*G06Q 30/06* (2012.01)
*G06T 19/00* (2011.01)
*G06F 17/30* (2006.01)

(52) U.S. Cl.
CPC ......... *G06Q 30/0643* (2013.01); *G06F 17/30* (2013.01); *G06T 19/006* (2013.01)

(58) Field of Classification Search
CPC .................................................. G06T 19/006
USPC ........................................................ 345/633
See application file for complete search history.

(56) References Cited

U.S. PATENT DOCUMENTS

| 6,222,937 B1* | 4/2001 | Cohen .................. G06T 15/06 345/634 |
| 6,736,316 B2* | 5/2004 | Neumark ............... G01S 5/04 235/383 |
| 6,799,065 B1* | 9/2004 | Niemeyer .......... A61B 1/00149 600/407 |
| 7,290,707 B2* | 11/2007 | Sawasaki ........... G06Q 10/0875 235/385 |
| 7,537,170 B2* | 5/2009 | Reed .................... G06T 1/0042 235/375 |
| 8,300,884 B2 | 10/2012 | Sharma |

(Continued)

FOREIGN PATENT DOCUMENTS

WO    WO2014165755    10/2014

OTHER PUBLICATIONS

MAR shopping assistant usage: Delay, error, and utility Subhashini Ganapathy; Glen J. Anderson; Igor V. Kozintsev 2011 IEEE Virtual Reality Conference Year: 2011.*

(Continued)

*Primary Examiner* — Javid A Amini
(74) *Attorney, Agent, or Firm* — Digimarc Corporation

(57) ABSTRACT

A decade from now, a visit to the supermarket will be a very different experience than the familiar experiences of decades past. Product packaging will come alive with interactivity—each object a portal into a rich tapestry of experiences, with contributions authored by the product brand, by the store selling the product, and by other shoppers. The present technology concerns arrangements for authoring and delivering such experiences. A great variety of other features and technologies are also detailed.

20 Claims, 7 Drawing Sheets

(56) References Cited

U.S. PATENT DOCUMENTS

| | | | |
|---|---|---|---|
| 8,503,760 B2 | 8/2013 | Lee et al. | |
| 2001/0049671 A1* | 12/2001 | Joerg | G06F 17/30864 706/50 |
| 2002/0066111 A1 | 5/2002 | Rodriguez | |
| 2002/0106135 A1* | 8/2002 | Iwane | G06K 9/522 382/305 |
| 2003/0158969 A1* | 8/2003 | Gimson | G06F 17/30905 709/246 |
| 2007/0086679 A1* | 4/2007 | Kudo | H04N 1/506 382/294 |
| 2007/0276841 A1 | 11/2007 | Rhoads | |
| 2008/0300011 A1 | 12/2008 | Rhoads | |
| 2009/0036902 A1* | 2/2009 | DiMaio | A61B 19/2203 606/130 |
| 2009/0152348 A1* | 6/2009 | Ostrowski | A47F 9/047 235/383 |
| 2009/0285483 A1 | 11/2009 | Guven et al. | |
| 2009/0286570 A1 | 11/2009 | Pierce, Jr. | |
| 2009/0293003 A1 | 11/2009 | Nykamp | |
| 2010/0033404 A1* | 2/2010 | Hamadou | G06T 7/004 345/8 |
| 2010/0046842 A1 | 2/2010 | Conwell | |
| 2010/0098326 A1 | 4/2010 | Abeloe | |
| 2010/0158310 A1* | 6/2010 | McQueen | G06K 9/00 382/100 |
| 2010/0179859 A1 | 7/2010 | Davis et al. | |
| 2010/0199232 A1* | 8/2010 | Mistry | G06F 1/163 715/863 |
| 2010/0228632 A1 | 9/2010 | Rodriguez | |
| 2011/0018903 A1 | 1/2011 | Lapstun et al. | |
| 2011/0058733 A1* | 3/2011 | Inoue | G06F 17/30247 382/154 |
| 2011/0069229 A1 | 3/2011 | Lord | |
| 2011/0102605 A1* | 5/2011 | Hannaford | G06F 17/3087 348/207.1 |
| 2011/0161076 A1 | 6/2011 | Davis et al. | |
| 2011/0212717 A1 | 9/2011 | Rhoads et al. | |
| 2011/0214044 A1* | 9/2011 | Davis | G06T 11/00 715/201 |
| 2011/0254840 A1* | 10/2011 | Halstead | G06T 15/04 345/421 |
| 2011/0274310 A1 | 11/2011 | Rhoads | |
| 2011/0307786 A1 | 12/2011 | Shuster | |
| 2012/0028577 A1 | 2/2012 | Rodriguez et al. | |
| 2012/0046071 A1 | 2/2012 | Brandis et al. | |
| 2012/0062596 A1* | 3/2012 | Bedi | G06Q 30/0256 345/633 |
| 2012/0075343 A1* | 3/2012 | Chen | G09G 5/397 345/633 |
| 2012/0077542 A1* | 3/2012 | Rhoads | G06K 9/2063 455/556.1 |
| 2012/0092507 A1* | 4/2012 | Jung | H04N 5/272 348/207.1 |
| 2012/0214544 A1 | 8/2012 | Shivappa et al. | |
| 2012/0218444 A1 | 8/2012 | Stach | |
| 2012/0224743 A1* | 9/2012 | Rodriguez | G06T 11/60 382/103 |
| 2012/0230543 A1* | 9/2012 | Boncyk | G06F 17/30247 382/103 |
| 2012/0235887 A1 | 9/2012 | Border et al. | |
| 2012/0243732 A1 | 9/2012 | Swaminathan et al. | |
| 2012/0284012 A1 | 11/2012 | Rodriguez et al. | |
| 2013/0124148 A1* | 5/2013 | Jin | G06F 17/5086 703/1 |
| 2013/0141548 A1* | 6/2013 | Tenn | G06T 7/407 348/50 |
| 2013/0223673 A1* | 8/2013 | Davis | G06K 9/78 382/100 |
| 2013/0250048 A1 | 9/2013 | Aller | |
| 2013/0260727 A1 | 10/2013 | Knudson et al. | |
| 2013/0293530 A1* | 11/2013 | Perez | G06T 19/006 345/418 |
| 2013/0308045 A1* | 11/2013 | Rhoads | H04N 5/2256 348/371 |
| 2014/0002643 A1* | 1/2014 | Aziz | H04M 1/72522 348/143 |
| 2014/0063061 A1 | 3/2014 | Reitan | |
| 2014/0086494 A1* | 3/2014 | Benhimane | G06T 3/0093 382/215 |
| 2014/0181630 A1* | 6/2014 | Monney | G06K 9/00201 715/232 |
| 2014/0267723 A1* | 9/2014 | Davidson, Jr. | H04N 7/183 348/147 |
| 2014/0300637 A1* | 10/2014 | Fan | G06T 7/0046 345/634 |
| 2015/0289945 A1* | 10/2015 | Nguyen | A61F 2/02 623/23.72 |
| 2016/0071325 A1* | 3/2016 | Callaghan | G06T 19/006 345/633 |

OTHER PUBLICATIONS

Visual augmented reality interface for table-top e-business environment Alfred Chen; Ya-ling Huang; Chien-hsu Chen; Kuang-ching Tai 2006 7th International Conference on Computer-Aided Industrial Design and Conceptual Design.*

International Search Report and Written Opinion of the International Searching Authority, PCT/US2014/032969 (published as WO2014165755), dated Oct. 28, 2014.

Dearsley, Augmented Reality for Real Estate; a few examples, (retrieved on Oct. 22, 2014). Retrieved from the internet: URL:https://www.youtube.com/watch?v=LgBCkIDQjb0.

Esko, Esko Store Visualizer, 2010 (retrieved on Oct. 22, 2014), Retrieved from the internet: URL:https://www.youtube.com/watch?v=xeBma69wl1ko.

Stiktus channel, Introducing Stiktu 2011 (retrieved on Oct. 22, 2014), Retrieved from the internet:URL:https://www.youtube.com/watch?v=7f941SqE9V8&list=UUABUG9T5A211Ad7U4RM27zg.

* cited by examiner

IMAGERY AND ANNOTATIONS

RELATED APPLICATION DATA

This application claims priority to provisional applications 61/809,254, filed Apr. 5, 2013, and 61/818,839, filed May 2, 2013.

BACKGROUND AND INTRODUCTION

Shoppers presently can use their smartphones to scan product barcodes in stores, to obtain product information. This capability is expected soon to be available with head-worn apparatus, such as Google Glass. Applicant's published patent application 20130223673, and IBM's published patent application 20140002643, detail how such product information may be presented using augmented reality (AR) techniques.

AR techniques commonly work by recognizing an input image, and identifying (and presenting) an augmentation that corresponds to that imagery. One application of AR is in promoting movies. A user is invited to capture an image of a movie poster (e.g., for the movie Transformers). A corresponding application on the user's smartphone recognizes the poster artwork, and overlays a rendering of a 3D character from the movie (e.g., a Transformer who breaks out of the poster and starts a rampage).

Use of AR in retail shopping is expected to be less thrilling but more useful. For example, such a capability will allow shoppers to obtain ingredient lists and discount information. Social network integration will enable presentation of information gleaned from the shopper's social network friends, including their personal product reviews.

Prior AR implementations have been based on 2D imagery, e.g., triggering the corresponding annotation, and placing it—with respect to features of the 2D artwork. But packaging is three dimensional. And product packaging often warrants more than a single annotation.

In accordance with one aspect of the technology, multiple differently-oriented views of a 3D retail product package (e.g., a cereal box) are captured during an enrollment phase. (A camera used to capture the images may be fixed, and the package may be positioned on a rotating turntable.) This collected imagery is then processed to identify landmarks on different faces of the product. The landmarks may be robust image features (e.g., SIFT points), or an invisible Cartesian coordinate system that is defined by an array of steganographic watermark tiles encoded in the package artwork. In some embodiments, the captured views are processed to yield a 3D model of the product.

This information is then used as a basis for authoring plural AR augmentations for the product. For example, a marketing designer at the company that produced the product (e.g., General Mills) may define different augmentations respectively linked to (1) the General Mills logo on the front of the box, (2) the Wheaties logo on the front of the box, (3) the athlete's picture (e.g., Michael Phelps) on the front of the box, (4) the Nutrition Facts panel on the side of the box, (5) a text blurb about Michael Phelps on the back of the box, etc. etc. The designer simply selects (e.g., by graphical highlighting) the region of the box that is to be associated with a particular augmentation, and provides a link to the desired action.

Software translates the designer-highlighted region into coordinates that can be machine-recognized (e.g., using SIFT feature points, or steganographic watermark data). Corresponding information identifying the region, and the designer-determined annotation that is to be associated with that region, are stored in a database.

When a consumer later captures imagery of the cereal box, the product is recognized, and a variety of different annotations are presented—depending on the viewpoint. Exploring the product—by physically moving the package, or by interacting with an on-screen user interface—reveals additional annotations.

The annotations needn't all be defined by the product producer. Some annotations may be defined by the store in which the product is sold (e.g., Safeway). Other annotations may be defined by consumers. A Darwinian process can proceed, in which the most favored annotations are those that are routinely presented.

The present technology thus enables product packaging to come alive with interactivity—each object a portal into a rich tapestry of diverse experiences.

The foregoing and additional features and advantages of the present technology will be more readily apparent from the following detailed description, which proceeds with reference to the accompanying drawings.

DETAILED DESCRIPTION

Figure 1A:
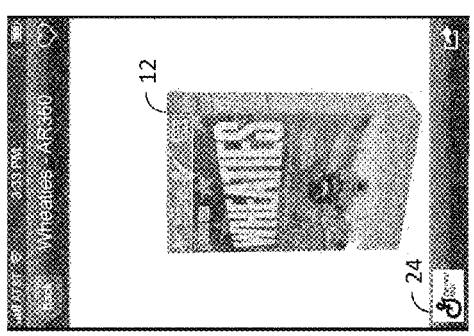
FIGS. 1A-1H show views of a cereal box from different viewpoints, with different annotations.

FIGS. 1A-H show views of a cereal box 12 from different orientations. In FIG. 1A, the front panel of the box is angled approximately 15 degrees relative to the camera viewpoint. That is, the box has been turned about 15 degrees in a clockwise direction from a frontal view, if the camera were originally fixed in front of the box. (Or, conversely, if the box is fixed, the camera has moved about 15 degrees in a counterclockwise direction from an initial camera position in front of the box.)

The box 12 is shown as rendered on a smartphone display screen, e.g., presented by a smartphone "app."

Figure 1B:
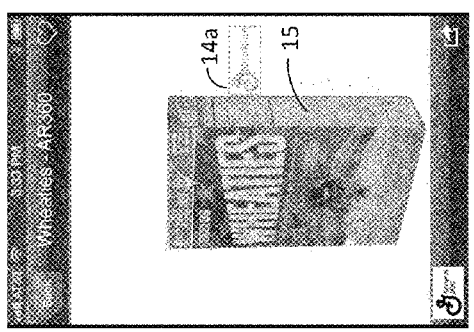

In FIG. 1B, the front panel is angled approximately 20 degrees relative to the camera viewpoint. At this orientation, the displayed cereal box is presented with a rendered annotation 14a—a rectangle that has a script-G (the General Foods trademark logo) and the word "Nutrition." This annotation is associated with a feature on the box, namely the Nutrition Facts block found on the box's side panel 15. This annotation can be added to the displayed information by the software app, or otherwise; e.g., it may be provided with imagery provided to the user device from a remote source.

Figure 2:
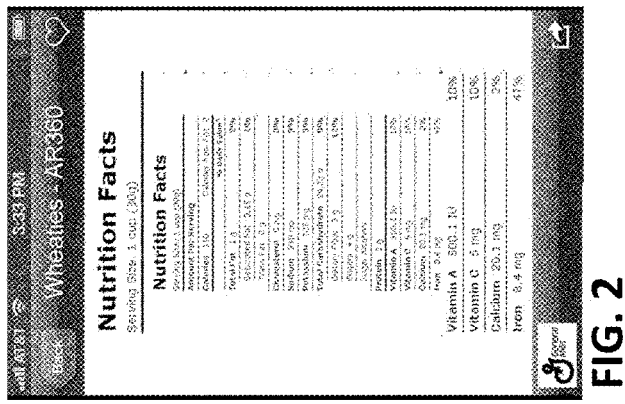
FIG. 2 shows a rendering of nutritional information.

If the user selects this annotation (e.g., by tapping it on the touchscreen), a rendering of the Nutrition Facts graphic from the cereal box is present in the smartphone UI, as shown in FIG. 2. Various transition effects can be employed to dynamically introduce this display. For example, it can expand out from one of the corners of the FIG. 1B display, or be wiped vertically or horizontally across that display. The user can return to the FIG. 1B display from the FIG. 2 display by a suitable signal, such as tapping on the screen, or by another gesture.

Note that while the feature with which the annotation 14*a* is associated (i.e., the Nutrition Facts block printed on the side panel) was visible in FIG. 1A, annotation 14*a* was not included in FIG. 1A. It wasn't until the box viewpoint was further rotated, to the FIG. 1B perspective, that the annotation 14*a* was presented.

Figure 1C:
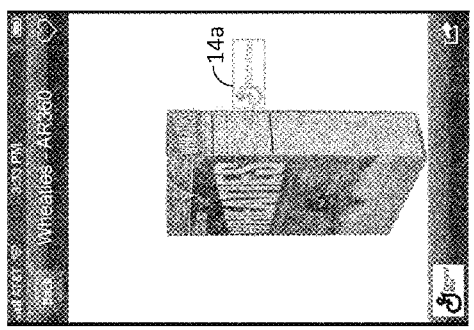

In FIG. 1C, the cereal box has been turned further (or the camera has been moved further), so that the front of the box now faces at an angle of approximately 50 degrees relative to the camera viewpoint. Note that the annotation 14*a* has followed the box, i.e., it has moved slightly-in from the border of the display screen, as the side of the box moves towards the center of the screen.

Figure 1D:
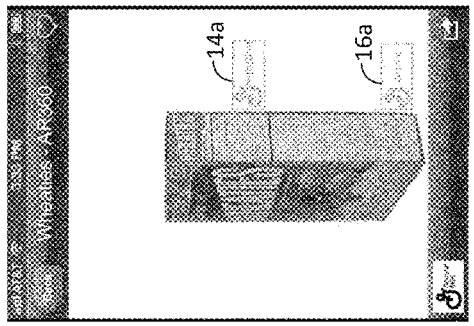

FIG. 1D shows the box further rotated relative to the camera, so that the front of the box now faces at an angle of approximately 60 degrees relative to the camera viewpoint. In this figure a second annotation, 16*a*, has appeared. This second annotation is associated with a second feature in the box, namely a text block detailing the General Foods guarantee of quality. This second annotation is labeled "Coupon" and, if selected, presents the user with a coupon that can be redeemed for a premium, such as a discount on a purchase of a box of General Foods cereal.

Figure 1E:
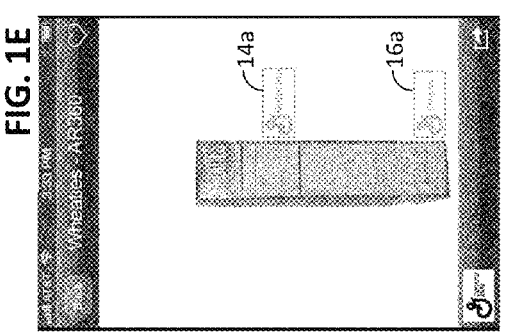

FIG. 1E shows the box still further rotated, now to about 85 degrees away from a frontal view. Again, the annotations 14*a*, 16*a* follow the box, moving in slightly from the edge of the screen display.

Figure 1F:
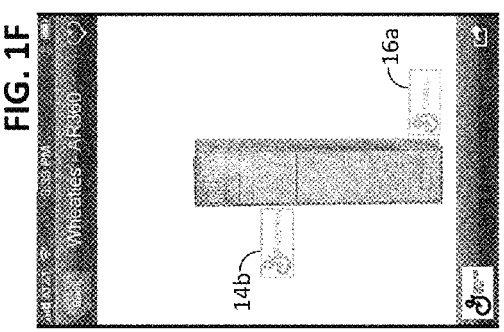
Figure 1G:
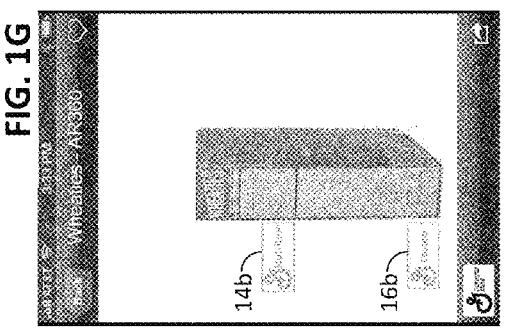

FIG. 1F continues this rotation further, to about 95 degrees from a frontal view. Notice that while the second ("Coupon") annotation 16*a* has remained on the right side of the box, the first ("Nutrition") annotation has moved to the left side of the box (and been relabeled 14*b*). FIG. 1G shows a still further rotation (e.g., to about 110 degrees), in which the second ("Coupon") annotation has joined the first annotation in flipping to the left side of the box. (The second annotation is here labeled 16*b*.)

Flipping one annotation to the other side first, and later the second annotation—instead of flipping both to the other side simultaneously—is more appealing aesthetically. Functionally, it also draws attention to the two annotations—particularly the first one to move.

Figure 1H:
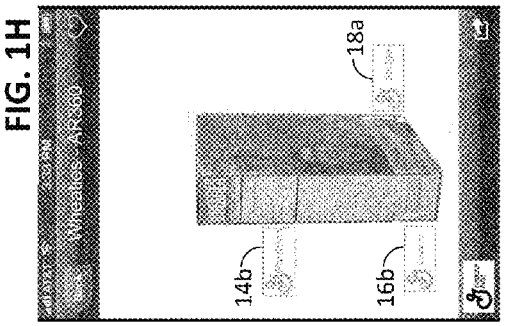

FIG. 1H shows the box after further rotation. At this orientation (e.g., about 125 degrees from the frontal presentation), a third annotation 18*a* (labeled "Recipe") comes into sight, associated with a feature on the back panel of the cereal box.

Although not shown, as the box continues to rotate, annotation 16*b* disappears first, and then with still more rotation, annotation 14*b* also disappears. Meanwhile, more annotations appear, as the rear panel of the cereal box comes more squarely into view.

As may be evident from the introduced appearance of annotation 14*a* in FIG. 1B, and the later introduced appearance of annotation 16*a* in FIG. 1D, different annotations can be arranged to appear at different viewing angles—even if associated with features that are found on the same panel of the box (i.e., co-planar features).

In one implementation, there is a threshold angular value datum that is stored in a memory, associated with each annotation, defining the viewing orientations at which that annotation should be rendered. For example, this datum may specify that the Nutrition annotation 14*a* should be presented when the side panel 15 faces at an orientation within +/−78 degrees of the viewpoint. (That is, when the angle between a surface normal of the side panel, and the camera viewing axis, is 78 degrees or less.)

For the Coupon annotation 16*a*, this threshold is smaller. Its stored threshold angle data may specify that this annotation should appear only when this viewing angle is 35 degrees or less. (Or, stated another way, this annotation should not be displayed when the angle between the surface normal from the side panel of the box and the viewing direction exceeds a stored threshold value of 35 degrees.)

By such arrangement, different annotations can be given different prominences. Some annotations may have very narrow viewing angles, requiring careful manipulation of the product (or the camera viewpoint) to find and reveal them. Other annotations are more generally viewable, from a diversity of viewpoints.

It will be noted that the "Nutrition" annotation did not change appearance when it flipped from one side of the box to the other (i.e., 14*a* and 14*b*). However, in other embodiments, it may be desirable to alter the presentation of an annotation as its location moves. For example, the placement of the "G" (General Foods) logo on the left side of the annotation may be flipped to the right side of the annotation, when the annotation is moved to the other side of the box. By such arrangement, the "G" logo is always adjacent the depicted box. In both cases, the same information content is conveyed (i.e., the logo and the word "Nutrition"), but the arrangement is different. Such two annotations are an example of what may be termed twin annotations.

As indicated, differently oriented views can be presented on the screen of a device that is moved to obtain the different views from a physical object (e.g., akin to a viewfinder, or augmented reality display). Or they can be presented on the screen of a stationary device, in front of which an item is moved to present different views to the camera. Or such a stationary device can render information provided to the device from elsewhere, such as from another device or system (e.g., the cloud). In this latter arrangement, the user may navigate among the various views such as by swiping on a touchscreen presenting the views, or by operating a video navigation UI (e.g., such as a shuttle control).

Annotations are typically tied to anchoring features. These can be of various types. For example, the nutrition panel on a food product may be regarded as an anchoring feature. Or a particular location in such a nutrition panel (e.g., the top left corner of the "F" in the "Nutrition Facts" heading) can be regarded as an anchoring feature. At the other extreme, the whole front (or side) panel of a box may be regarded as an anchoring feature.

An anchoring feature can also be defined by reference to a spatial coordinate in an item's geometry, such as a point two inches down from the top of the depicted Wheaties box, and one inch across the side panel that is to the left of the front panel (when viewed from the front panel).

An anchoring feature can also be defined by reference to a steganographic reference system. For example, if the Wheaties box is steganographically encoded with a tiled pattern, where each tile comprises 128.times.128 watermark elements ("waxels"), and the tiles are each encoding with a payload that includes a tile number (e.g., in an across-then-down numbering order), then an anchoring feature may be defined as waxel {63,1} in tile 23. (The artisan is presumed to be familiar with waxels, e.g., as further explained by patent publication 20110214044, and by references cited therein. Tiling of watermark patterns across a cereal box is discussed and shown in application Ser. No. 13/946,968, filed Jul. 19, 2013, now published as 20140052555.)

(An anchoring feature may also be termed a "hotspot" on the package. It may be a point on the package, or a region of any size.)

It will be recognized that the decision to present an annotation need not be triggered by detection of the corresponding anchor point in the imagery (e.g., by feature recognition). This decision can instead be triggered based on information about the viewed pose of the package, which may be discerned based on a part of the package unrelated to the anchor point. For example, the decision to present the Nutrition Facts annotation of FIG. 2 may be made based on pose information discerned from imagery of the front panel of the cereal box.

A software app that presents the user interface of FIG. 1 may be launched in response to detection of a box of Wheaties in the field of view of a user's camera-equipped device. For example, a user may be in a supermarket, and a Wheaties box on a shelf may be recognized by analysis of imagery captured by a smartphone carried by the user, or by a head mounted camera system worn by the user. (Thus, just as the annotations shown in FIG. 1 can be the origins of links to other information and actions, the FIG. 1 arrangement—itself—can be the destination of such a link, originated from elsewhere (e.g., from applicant's Discover app, as detailed in published patent application 20120284012).)

Once the user device has recognized the physical cereal box in the supermarket (e.g., by techniques such as digital watermarking or image fingerprinting—such as SIFT), the user can explore the annotations associated with the box. There are various ways in which this can occur. One involves applying the annotations over live imagery captured by the user device camera. That is, the user can manipulate the physical product in front of the camera. As different views are recognized (e.g., again by analysis of fingerprint or watermark information), different annotations can be caused to appear overlaid on the live camera imagery.

(The artisan will recognize that steganographic digital watermark data encoded in the artwork of printed packaging—such as on a cereal box—allows the pose of the box relative to the camera to be determined. Briefly, this is because the geometrical scale and orientation of the watermark information is known in advance (e.g., all items may be encoded with tiled watermark patterns that each comprises an array of 128×128 waxels, at a scale of 75 waxels per inch, with the tiling starting in the upper left corner of the item's panel). When sensed by a camera, the distortion of the sensed watermark pattern from its known configuration permits the viewing distance and other pose parameters to be determined. If reference SIFT data is known for the cereal box artwork, the box pose relative to the camera can similarly be deduced.)

A second way of exploring the annotations involves ignoring the live imagery captured by the user device camera, and instead presenting a sequence of still images (or video) provided from a remote computer system, e.g., across the internet, through which the user can navigate.

In this latter case, the views of the item may be authored by a third party. This third party can be a commercial service provider that specializes in capturing and distributing product imagery, such as Gladson, LLC (Lisle, Ill.) or ItemMaster, LLC (Skokie, Ill.). These companies typically are provided physical samples of each new product introduced by retail manufacturers, and capture a series of promotional imagery—such as by placing the item in a robotic studio that sequentially captures images at different product poses. For example, the Wheaties box of FIG. 1 may be photographed at every 10 degrees of horizontal rotation.

If the box is watermarked, the watermark information in the captured imagery can be decoded, so as to identify the placement of different watermark tiles at different locations on the box. (The payload of each watermark tile may include the GTIN identifier of the retail product, and the serial number of that tile on the box.) Map data can thus be produced, e.g., permitting each physical location on the box to be correlated with a corresponding coordinate in the watermark tile space (e.g., tile 23, waxel {63,1}). This map data can then be provided back to the retail manufacturer (e.g., General Foods), which can author the annotations that should be associated with different features on the box. General Foods may specify, for example, that a Nutrition annotation should be associated with watermark tile 8, waxel {23,55}, and that it should be rendered when within an angular viewing cone of 70 degrees. Similarly, it may specify that a Coupon annotation should be associated with watermark tile 37, waxel {110,63}, and that it should be rendered when within an angular viewing cone of 32 degrees. This information, together with associated link data (e.g., a URL to a Nutrition graphic, or to a video), is stored in a database where it can be accessed by the user device.

In some cases, annotation authoring can be as simply as identifying a content item (e.g., a graphic or a video) within a digital asset management (DAM) system used by General Foods to organize its media content.

The image data captured from the product sample can also be analyzed to derive SIFT feature information, by which the item can be identified. Map data can also be produced that permits each physical location on the box to be identified in terms of its placement relative to the SIFT features. Again, annotations can be authored on this basis.

The robotic processing of product samples by companies such as Gladson also typically gathers accurate product dimensions and other product shape/configuration data. From such information a 3D model of the product can be derived, in the form of a mesh, wire frame, or otherwise. Since the imagery is captured in the same process, the imagery can be correctly registered with the 3D model data. Gladson has announced a partnership with Red Dot Square to produce such 3D model data. (As detailed in application 61/838,165, filed Jun. 21, 2013, a variety of commercial software packages, including Autodesk 123D-Catch, and Cubify Capture by 3D Systems, Inc. (formerly Hypr3D), can alternatively be used to create 3D model data from plural images.)

This product model information can be stored in the noted database and provided to the user device, along with the other noted information, upon detection of a Wheaties box in a supermarket. This allows the user to explore a virtual rendering of the product on the user device—not by examining selected images (e.g., every ten degrees horizontally), or by navigating a fixed video sequence, but instead by using a 3D UI to explore the item in a manner of the user's choosing. Again, annotations appear in the manner defined by the manufacturer.

Thus, there are several possible viewing modes. In one mode, after the object has been recognized, the screen can show the object as sensed by the device camera. In a second mode, after object identification, the screen can disregard the physical scene, and present instead a sequence of stored images (or a video) of the object depicting different views, through which the user can navigate backwards and forwards, e.g., by swipes or other gestures. In a third mode, the physical scene is again disregarded, and the screen presents a rendering of a 3D model of the object, around which the user can navigate by gestures or otherwise. In each such mode, annotations can be added to the displayed information—either by the local device, or a remote device (e.g., the device that provides the stored images or 3D model). Sometimes combinations of such modes may be employed (e.g., the object may be segmented out of the imagery captured by the device camera, and a rendering of a 3D model can be presented—surrounded by the visual scene in which the object was found).

As just noted, in the case of a user device interacting with a physical item, it is typically necessary for the device to identify the item (unless the item is identified otherwise, such as by an indication from the user). Once the item is identified, the associated annotations can be downloaded to the device, such as from a remote database record that has been located using an item identifier. Each annotation is associated with parameters that define the circumstances when it should be displayed, such as the angular threshold referenced above.

The circumstances can also involve context—including user context and computational context. For example, if a particular user has a history of never selecting annotations that reveal recipes, then over time the user device can learn not to render recipe-related annotations.

Of course, this technology is not limited to cereal boxes, and is not limited to experiences that are commercially authored. Another embodiment concerns a user who is selling a car, such as on Craigslist or EBay. The user may take several photographs of the car. Using a software application, the user identifies a point in one of the photos where an annotation is desired, e.g., a dent that the user wants to call to the attention of prospective buyers. The application then invites the user to type the information that should be associated with that location on the depicted car (e.g., a note "This ding has an interesting history . . . "), or to paste website URL to which buyers should be able to link from that physical location on the car). The annotation can appear not just with the photo in which it was identified, but also other photos in which the dent (a feature anchor point) appears.

Data identifying the noted points in the pictures are stored in a database, together with the associated annotation data.

Other Remarks

While illustrated in the context of a physical, retail product (e.g., a box of Wheaties), the same principles can be applied to synthetic shapes, e.g., rendered from 3D image files.

Similarly, the information revealed when a user taps the annotations shown in FIG. 1 needn't be static (such as the nutrition information shown in FIG. 2). Instead, the annotations can link to dynamic behavior, such as initiating other software activity (e.g., launching other software or another app), or displaying a video. In a Wheaties box featuring a Tour de France rider, for example, an annotation can link to a live video showing the rider at that very moment, as captured by a camera in the rider's support car. Or the annotation can link to a map on which the cyclist's location at that moment is shown by a flashing red arrow. Etc.

Figure 3B:
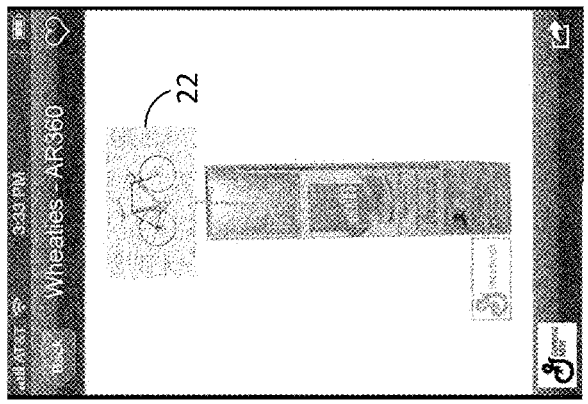
FIGS. 3A and 3B illustrate how a feature on a cereal box can link to a labeled graphic, which changes in viewpoint presentation with changes in viewpoint of the cereal box.
Figure 3A:
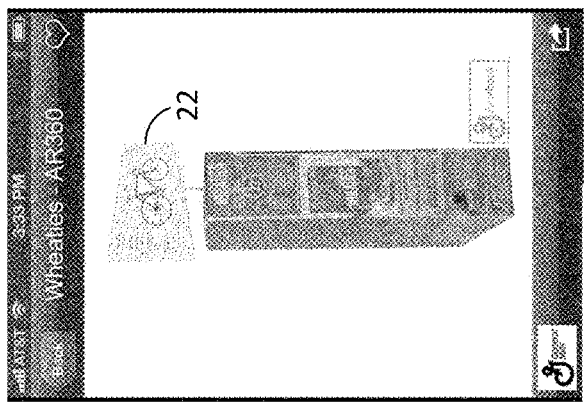

In some implementations, the annotations needn't be links to only destinations from which corresponding "payoffs" are fetched and rendered. Instead, the annotations themselves can present the payoff information. FIGS. 3A and 3B, for example, show how a feature of the depicted Wheaties box links to a labeled view 22 of a bicycle. The bike depiction changes in size and perspective with different views of the box, simulating that it occupies the same 3D space as the box, and is subject to similar geometrical perspective phenomena (e.g., foreshortening, etc.) as the viewpoint of the box changes.

While reference was made to selecting the annotations by tapping on their respective screen graphics, other arrangements can alternatively be employed. For example, if there is just a single annotation, tapping on the General Foods logo 24 in the lower left of the UI can serve to select that annotation. If several annotations are present on the screen, each tap of the logo can highlight a different one of the annotation graphics, e.g., progressing in a clockwise direction from the annotation graphic closest to the lower left corner. When the desired annotation is highlighted, the user can touch and hold the logo 24 to effect selection of that annotation.

Selection of annotations can be performed by means other than screen tapping. Voice recognition, for example, can be used. If only one annotation is visible, the user can select that annotation by speaking a word such as "select" or "go." If several annotations are visible, the user can select one by speaking a distinctive keyword, such as "nutrition" or "recipe." Some annotations may be selectable by plural different keywords. For example, where an annotation presents several words or icons/illustrations, it may be selected by speaking any of those words, or any word descriptive of the icon/illustration.

It will be recognized that item-identifying information may be determined from sources other than image data. For example, a product identifier may be read from an NFC (RFID) chip on a product, on a shelf display, or elsewhere, using the NFC reader provided in many smartphones. From image data, a barcode can also be decoded.

As noted, watermarks enable the pose of an object to be determined from analysis of image data. This pose information includes distance from the camera to the object. (The apparent scale of the watermark diminishes with increasing distance.) Thus, a conventional camera, imaging a watermarked object, and analyzing the watermark information, is effectively a depth-sensing imager. The physical inclination of watermarked surfaces is similarly determined from the geometrical distortion of the known watermark signal. This capability allows the physical 3D configuration of a watermarked object to be discerned from 2D image data. This is akin to the familiar "structure from motion" process of determining a 3D shape, but without any requirement of motion. A static image suffices. All of the technologies and applications that use depth-based imagery, or structure derived from imagery, can be practiced more simply by watermarking the subject, and discerning the depth/structure from the watermark information.

Actively Managed Consumer Packaged Goods

The following discussion elaborates on some of the above-discussed points, and details additional novel technology, e.g., concerning active management of consumer packaged goods (CPGs).

A decade from now, a visit to the supermarket will be a very different experience than the familiar experiences of decades past. Packaging will come alive with interactivity—each object a portal into a rich tapestry of experiences, with contributions authored by the brand, by the store, and by other shoppers. It all begins with the packaging.

A GIS (Geographic Information System) serves as a useful analogy. A GIS is a system designed to capture, store, manipulate, analyze, manage, and present all types of geographic data. In some aspects, GIS technology merges cartography, statistical analysis, and computer science to provide an infrastructure for spatial data. So, too, do aspects of the present technology.

A GIS system typically provides many layers of spatial information relating to a geography. The regional government for Portland, Oreg., for example, publishes an on-line MetroMap application, by which geographical information about the region is available for manipulation and exploration. A base map is selected and can comprise satellite imagery, terrain information, and/or street map information. On top of the base information a user specifies desired layers that should be visually overlaid. These can include, e.g., zip codes, school districts, tax lots, wetlands, vacant land, fire districts, etc., etc.

ESRI is a leader in the GIS market, and its ArcGIS, ArcView, ArcMobile, and ArcServer software tools are exemplary of the tools available in this space.

The artisan is presumed to be familiar with GIS technology, including techniques by which disparate spatial data sets are stored, manipulated, and geometrically registered with each other.

Figure 6:
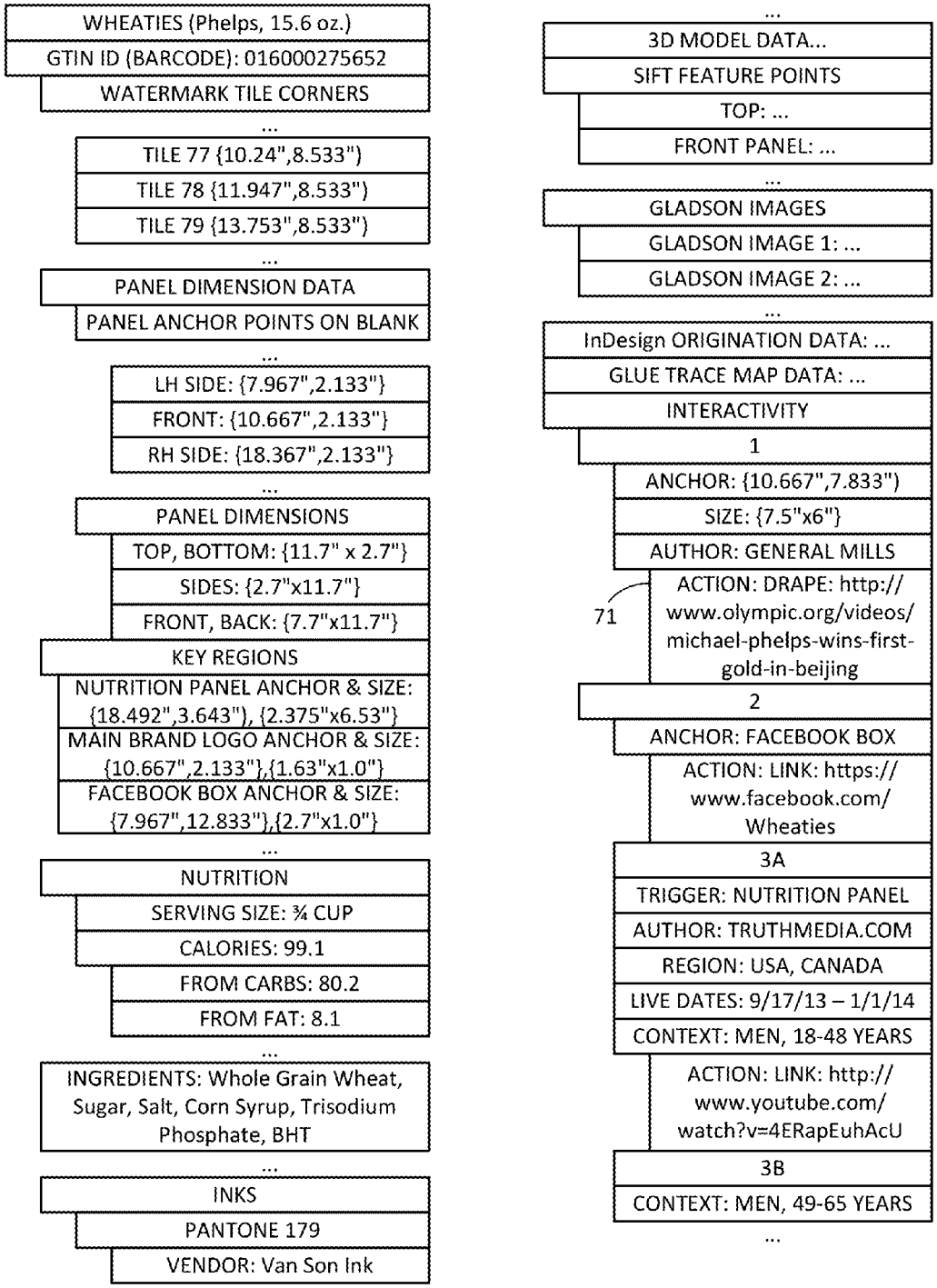

Back to packaging, just as a GIS system integrates disparate information relating to a geographical region, so too does an implementation of the present technology integrate disparate information relating to a product and its packaging. FIG. 6 shows part of a simple database record that integrates some of this disparate information for the Wheaties box.

When General Mills introduces a new Wheaties package, it provides a sample to Gladson. As noted, Gladson employs robotic apparatus to photograph the package from multiple viewpoints, and to capture weight and dimension data.

From the captured imagery, the locations of features on the packaging are identified. These include the headline name/logo, the nutrition panel, the ingredients list, the photographic image, the color splashes and ornamentation, the narrative text blurbs, etc., etc. Each distinguishable item, or class of items, may be stored in a corresponding layer of information (in a GIS sense) in the FIG. 6 database record for the object.

Figure 4C:
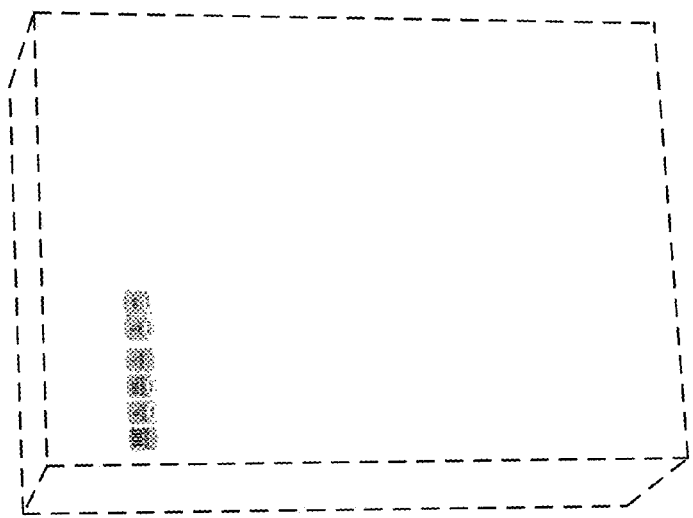
FIGS. 4A-4C show some of the layer information stored about a product (i.e., a box of Wheaties cereal) in a database.
Figure 4B:
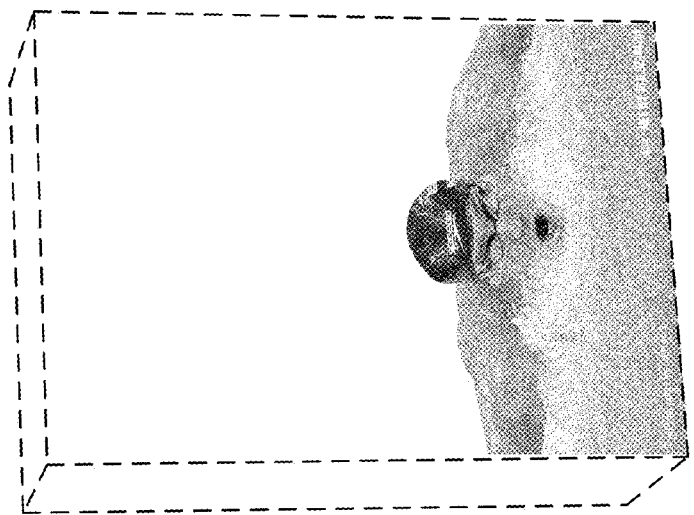
Figure 4A:
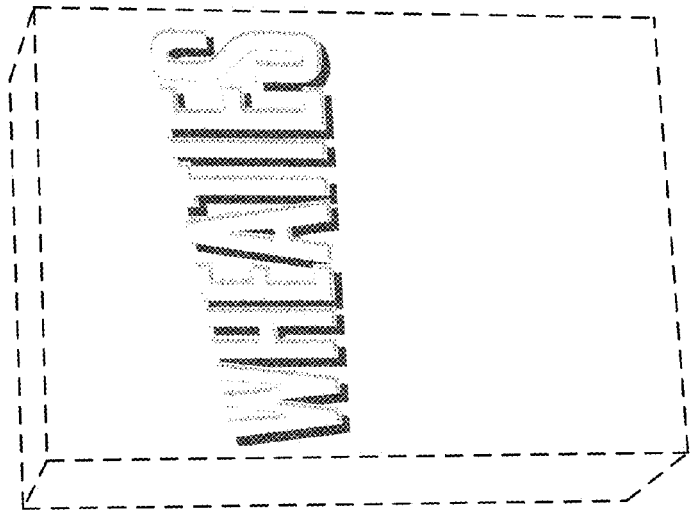

For the illustrative Wheaties package, FIGS. 4A-4C show, respectively, layers for the headline name/logo, the photographic image, and the nutrition information. (Although not legible in FIG. 4C, the illustrated front panel feature details that one serving of Wheaties includes 100 calories, 0 grams of saturated fat, 190 mg of sodium, 4 grams of sugar, 3 grams of fiber, and 45% of the recommended daily value of iron. This FIG. 4C layer may also include the Nutrition Facts graphic, which is printed on the hidden right side of the package.) A package may have a dozen or more such layers dedicated to artwork and other printed information on the package (e.g., net weight statement, expiration date stamp, box-top coupon, Facebook link, recipe, customer service contacts, corporate address, recycling information, etc., etc.). Each can be separately detailed in the database record. (FIG. 6 omits much of this information, for clarity of presentation.)

Stepping back to original creation of the package artwork, a programmed image processor may have been employed to slather a pattern of tiled watermarks across package artwork as an automated pre-press operation—after the artwork was otherwise composed. This pattern can serve as a coordinate system by which the locations of the overt features can be determined.

The position of the watermark tiles, relative to features in the artwork, may be unknown to designers of the package art. But after the package has been assembled and filled with product, the imagery captured by a party such as Gladson can be analyzed to determine the positions of the watermark tiles in the captured imagery, and this information can be stored in the database record. From this information, Gladson (or another) can generate package map information that defines the spatial correspondence between artwork features on the package, and the watermark tiles. (This spatial correspondence information can also be stored in the database record.) With such information, the marketing department of General Mills can then associate different annotations/promotions with different features of the package, to thereby author an interactive experience for the package. A human operator can define this interactivity by reference to visible features. Through the stored map information, these references can be translated to refer to imperceptible watermark features (which are often more easily identified by software apps than visible features), or to areas defined in terms of absolute {x,y} coordinates on the box. (In FIG. 6, the position information is given relative to the upper left hand corner of the printed cardboard "blank" from which the box is assembled, but of course other coordinate reference systems can be used.)

Figure 5:
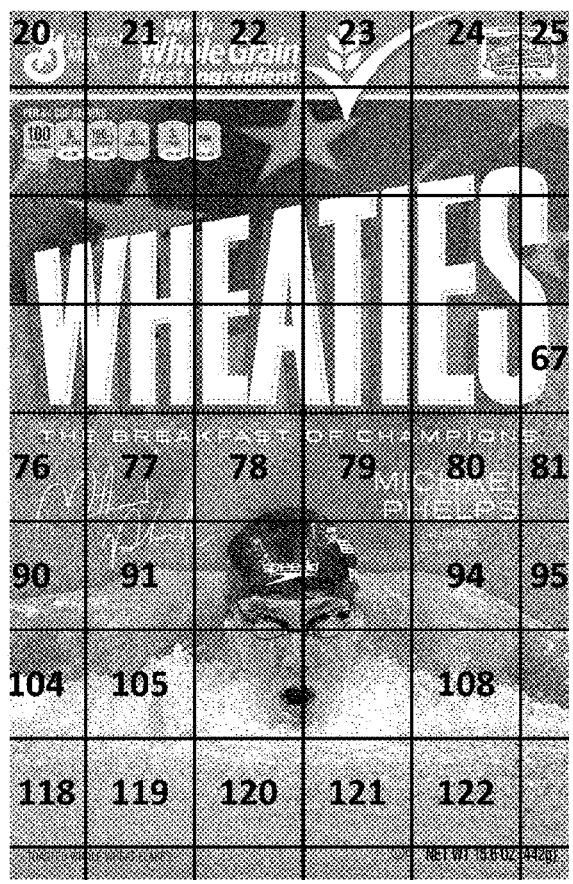
FIGS. 5 and 6 show some of the other information about Wheaties cereal in the database.

FIG. 5 shows this watermark map information stored in the database. In this example, an automated watermark embedding process placed the origin of the tiled watermark pattern at the top left corner (not shown) of the flat package blank from which the 3D package is assembled (e.g., by folding and gluing). The width of the blank is about 23 inches, which requires 14 side-to-side watermark tiles to span. The top part of the blank, folded to produce the top panel of the package, spans the first row of 14 tiles. The first tile that appears on the front face of the package is the bottom right part of tile 20, which is followed by the bottom parts of tiles 21, 22, 23, 24 and 25 across the top front edge. (Part of tile 25 folds over onto a side panel.) Parts of other rows of watermark tiles span successive horizontal stripes across the front of the package, as shown in FIG. 5. (Certain tile numbers are omitted from the figure for clarity of presentation.)

This package map information, defining the spatial correspondence between artwork features on the package and the watermark tiles, is stored in layer form in the database, e.g., using GIS-like data constructs. Such layer(s) can identify the location of each watermark tile, the data payload for each tile, the artwork encompassed, the annotation(s) associated with different location in the tiled pattern, etc.

In a simple example, an interaction designer in the General Mills marketing department may specify that if a user taps anywhere on the artwork depicting Michael Phelps on the front of the box, such user action should trigger launch of a 15 second Michael Phelps video from which the still image on the cereal box was clipped. The software tool can translate this reference, using the watermark map information, to a tap anywhere in watermark tiles 91-94 or 105-108. (Fractional parts of a watermark tile can also be referenced, using waxel offsets from the upper left corner of a watermark tile.)

Fingerprint data for the object is also discerned. It, too, is stored as a further layer of information in the reference database record. Similarly, "Thingerprint" data is generated from the collection of image views, or from the 3D model, and this information is also stored. (Thingerprint technology is detailed in patent application 61/838,165 and permits identification of 3D objects by profile features, Morse/morphological features, and image features.)

Other data layers store luminance and color information captured from the box in the Gladson image capture process.

Likewise, 3D model information that is derived from the Gladson-captured information is also stored in the reference database record.

(While the foregoing described certain layers as being populated by data captured by Gladson, these layers—or others—can be populated from the origination materials authored by the General Mills graphic designers, e.g., InDesign files, produced by Adobe's InDesign publishing software. Similarly, while the discussed layers generally contain graphical information about a product package, other information—such as physical information—can be provided as well. For example, one or more layers can detail the vendors of the different inks used, and their respective identification numbers. Another layer can define the locations of glue traces that were laid down to assemble the box. Other attributes may not be spatial information, per se, but can relate to the object as a whole, i.e., global metadata. Examples include where the product was produced, the states into which it was shipped, the retailers known to stock the product, etc.)

The stored layer data serves as a baseline reference to which different package functionalities can be mapped. The nutrition information is here, and the General Mills logo is there, etc. These are locations to which functionally-related augmentations (payoffs) are anchored, and relative to which augmentation imagery can be draped on the model. (An example of draped augmentation imagery is where the photograph of Michael Phelps on the front of the Wheaties box is masked, and a video is instead rendered in its place—the video being one from which the still-image swimming photograph of Phelps was taken. This is indicated by the "DRAPE" specification in the FIG. 6 database record, at 71.)

The augmentations may be referred to as "bubbles"—analogous to the dialog bubbles spoken by printed comic characters. The term is also used herein synonymously with "annotations."

As noted, a region on the package that elicits a certain annotation may be referred to as a "hotspot" for that annotation. Hotspots can be spatially defined in various ways, including by reference to watermark information for that region, by reference to fingerprint landmarks (e.g., scale- and rotation-invariant feature points, such as SIFT), by Cartesian coordinates (e.g., of opposing corners of a rectangular region), by graphical mask data stored in the database (defined using vector graphics, or by artwork such as in FIGS. 4A-4C, or otherwise), etc.

While the foregoing has detailed certain aspects of preparing the package for interactivity (i.e., registering it in the system), this preparation phase also extends to preparing the "pipes and other plumbing" by which its interactivity will be delivered. This supporting infrastructure needs to allow the brand, and/or other parties, to revise the product interactivity once the product is out in the stores.

That is, the experiences associated with the Wheaties package desirably should not be defined once and fixed forever. Rather, they should be adaptable based on events and circumstances, including different ad campaigns, introduction of the product into different markets, user feedback, different user and other contexts, retailer customization, etc. The augmentations should be tunable.

For example, an augmentation may be functionally associated with the photograph shown in FIG. 4B, and defined—initially—in a generic manner, e.g., as Bubble-1. When the product is first released, data in the database can specify that Bubble-1 should present the swimming video clip from which the still image was excerpted. But if Phelps later does a pool-side victory dance at an exhibition swim meet in Santa Clara, Calif., which received lots of local press coverage, then General Mills can revise the stored data to specify that, for the next thirty days, users in the Bay Area of California who interact with the photograph should instead be shown a video clip of Phelps' victory dance at the Santa Clara pool. Similarly, if a YouTube video featuring Phelps goes viral (e.g., the "Call Me Maybe" video featuring the US Olympic Team swimmers), then the augmentation associated with the Phelps picture may be temporarily defined to present the YouTube video.

Each generic bubble is thus associated with stored information detailing the information and graphics that should be presented to a user that selects a corresponding feature (hotspot) of the package for interaction. This information can be stored in a globally-dispersed fashion. Just as General Mills caches locally-customized versions of its web site at servers around the world (e.g., a content delivery network contracted from Akamai Technologies), so too can augmentation fulfillment data for General Mills' products be stored in regionally-tailored, globally-dispersed fashion (e.g., replicated database records). As marketing campaigns and other factors dictate, the augmentation fulfillment data for each product bubble can be revised.

Moreover, the augmentation information delivered to consumers needn't be the same for all consumers. As just-noted, consumers in some regions may receive augmentations different than consumers elsewhere. Similarly, the augmentations delivered to a particular consumer can depend on personal demographics, preferences, history, other context, etc. John and Jane Doe—who shop together for groceries while pushing toddler Tommy Doe in the shopping cart—may leave the supermarket with different product interaction experiences.

The augmentations needn't all be brand-defined. Just as conventional television broadcasts include a mix of promotional messages—some from national advertisers, some from the national broadcast network, some from regional advertisers, and some from the regional broadcaster, so too can CPG-related augmentations be defined by a variety of different parties.

The brand (e.g., General Mills) may insist on control of all augmentations associated with its trademarks and other proprietary features. But other aspects of the packaging may invoke augmentations defined by the retailer (e.g., Safeway). After all, the consumer is typically interacting with the product in physical space owned by the retailer, and may be using network services (e.g., WiFi) provided by the retailer.

In some embodiments, the augmentations viewed by the consumer depend on what software application is used to interact with the product. If the consumer is using the Safeway shopping app, then Safeway's augmentations will be those that are used by default. If a General Mills app is being used, then it will naturally want to provide an experience that favors its own content. Rules in the app (or in the server with which it communicates) can be processed to arbitrate between alternative augmentations, and decide which should be rendered to a given user at a given time and place. These rules can work on data that includes all manner of context information—not just the provider of the app (e.g., Safeway or General Mills), but also the user demographics, location, past history, other context, etc.

Many retailers, and brands, employ digital asset management (DAM) systems for ingesting, cataloguing, storing, retrieving, and retrieving, product-related images, video and other media assets. Extensis, Razuna and North Plains are a few of the many vendors offering DAM technology. Such systems can be employed to serve as databases in which object information is stored, and from which responsive augmentations are served, etc.

From the foregoing it will be seen that, before a product is first shipped to stores, various data layers associated with the packaging can be defined, and generic augmentations can be functionally mapped to different features or locations (hotspots) in these layers. Data storage to receive fulfillment data for each of these augmentations is defined, and provisions are made to replicate such stored data throughout a geographical area in which the product may be distributed.

Once a product's baseline identity has been registered in the system (e.g., by watermark, fingerprint, etc.), and a template of its interactivity (e.g., functionally-mapped augmentations) has been established, it is ready to be passed to the brand's creative team, for creation of default interactions for some or all of the augmentations.

This takes us (back) to the authoring process—bringing the product to life. Using a product identifier (e.g., watermark or fingerprint data), or otherwise, a designer opens up the data record(s) that defines the virtual instantiation of the interactive product. An authoring tool may render this data to graphically show a 3D model of the product with blank bubbles—each functionally mapped to a product hotspot. Different layers may correspond to different bubbles (augmentations). The designer navigates around the 3D model, selects one of the bubbles and uses familiar web authoring tools (e.g., HTML5, Java, etc.) to create compelling content. Alternatively, the designer can map the bubble to fulfillment information already available in the brand's digital asset management system, e.g., so that when a consumer selects the augmentation, a stored video plays on a particular part of the device display (which may be defined relative to the position of the product, or product model, on the display). Augmentation defined in this fashion is then added to a corresponding database record.

To date, augmented reality has been used mostly as a parlor trick—eye candy without lasting utilitarian value. The charter for creative designers is to avoid such pitfalls in use of the present technology, and provide augmentation responses that meet bona fide customer needs with enduring solutions.

Of course the sky is the limit on creativity. The far out musings of the edgiest designer will seem tired and dull five years out, as new frontiers of technology are opened, and early-adopting creatives rush in. But again, enduring utilitarian value—not glitz—is the mantra.

One form of data that has enduring utility seems to be health-related data/statistics. The recommended daily allowance of salt and carbohydrates is an example. These allowances can vary with age, gender and weight. While the figures published on consumer packaged foods are, of necessity, average values, the augmentations provided by the present technology can be tuned so as to present data appropriate for the user's particular age, weight and gender.

Some health-conscious shoppers may be interested to view the nutrition facts for Wheaties and other products in the context of the more stringent benchmarks established by the European Union, or those proposed by the US National Academy of Sciences but not yet adopted by the US FDA.

For some augmentations, enduring utilitarian value comes from crowd-sourced, social information. Crowd-sourced product reviews on Amazon and TripAdvisor are generally regarded as useful; a shopper on EBay who disregards a seller's poor feedback ratings is asking for trouble. In like fashion, crowd-sourced ratings and other commentary on consumer packaged goods is expected to be a valuable tool.

More valuable, still, is information from the shopper's own circle of acquaintances—such as friends on Facebook and other social networks.

Thus, in accordance with another aspect of the technology, some product augmentations may link to sites where reviews are posted. Such a site's user interface can allow filtering to show, e.g., only feedback from the user's friends; or from others in the user's zip code, county, or state; or from people who are otherwise demographically similar to the user—such as by gender and age. The feedback from other users may, itself, be rated for utility (much as Amazon users' votes as to which customer reviews are most useful), and the site's user interface may permit filtering to show only feedback rated in the top ten percent of all available feedback. And combinations of such filter criteria, etc.

In one particular implementation, a product may include an augmentation that overlays the social network profile picture of a friend who has rated a product, together with the text of that friend's product commentary. With a quick gesture, the user device can place a phone call to that friend, or start an instant messaging session, so that user can pose clarifying questions to that friend.

A supermarket shopper who faces a bewildering array of pickles on the shelf may activate a feature in the software that causes each jar to be recognized, and overlaid with numeric ranking data (e.g., number of stars, out of five) contributed by others. Where a friend has ranked a product, that friend's face may appear overlaid on the product. The face may be bordered with a color indicating whether the review is positive (green) or negative (red). The numeric ranking data may be similarly color-coded. A quick scan of such information (which may be presented by headworn apparatus such as Google Glass) may help the shopper quickly overcome his initial bewilderment, and make an informed choice.

In some cases the crowd-sourced information isn't review data. Instead, it is simply a record of one or more product purchases, e.g., by a particular friend, or by all friends in the aggregate. Such information is known for all shoppers enrolled in a store's loyalty program and, with suitable permissions, can be shared with some or all other shoppers. For example, when Tom is picking up ice cream and chips to bring to a potluck hosted by the neighbors, he may configure the software to graphically indicate which ice cream and chip varieties the neighbor evidently prefers, as indicated by purchase history.

(As evident from the foregoing, the interactivity supported by the present technology needn't be limited to isolated examination of one product at a time, but can extend to methods that process views of multiple products at a time.)

Some consumers may find augmentations authored by other consumers to be more useful than augmentations that the brands or retailers publish. Besides product reviews, this can include other consumer crowd-sourced content.

Consider the Wheaties box, which may have a previously-defined augmentation for the Nutrition Facts panel, but no augmentation specifically linked to its statement of sodium content. A shopper who is on a personal campaign to increase awareness of salt in our diet may define her own annotation that is linked to the sodium entry on the Nutrition Facts. She may snap a picture of the box side panel and, with a rudimentary authoring app, outline a rectangle around the sodium entry. The app then prompts her to enter information, or a link, that should be used in presenting a corresponding augmentation. The shopper navigates to an online article published by Prevention Magazine, "8 Health Dangers of a High Sodium Diet," and instructs the app to present the article title as a hyperlinked augmentation to future shoppers who image the Sodium entry on the Wheaties box. If such a future shopper taps the displayed annotation, the article appears on their screen.

In like fashion, other shoppers can author augmentations that are mapped to this and other product features on the Wheaties box.

Over time, many alternate annotations for the Wheaties box sodium entry may be authored by different shoppers. If there are two alternate augmentations, both may be displayed in a two element menu within a single augmentation bubble, and a shopper can elect to tap one, either, or none, to pursue further information. The same approach may be used with three or four alternative augmentations. But at some point there are too many alternatives to practically display them all. In this case, a menu of annotations may present, e.g., three alternatives, and invite the user to tap "More . . . " to see the next, e.g., ten. The three alternatives that are presented in the augmentation bubble are those that are most commonly tapped by consumers for more information. The augmentation thus tunes itself so that the most popular (useful) crowd-sourced links rise to the top of the list, and are the ones most prominently presented as available alternatives.

Of course, the same sorts of annotations can be authored for features on other products, throughout the retail universe. Eventually the number of crowd-sourced annotations may far exceed the number of brand- and retailer-authored annotations.

Data for these crowd-sourced annotations may not be stored in the databases employed by General Mills and other brands/retailers, but may be stored in a Creative Commons or other public service data repository. Or it may be stored at web site dedicated to the particular product. Some implementations of the technology treat the different data repositories (General Mills, Safeway, Creative Commons) as a federated database, across which a single search can be done for relevant annotations. (Of course, the opposite—a single, unitary database in which all the information is physically consolidated—can also be employed.)

Preference information stored by the shopper can pre-configure how the software treats different or alternative augmentations, e.g., specifying that it should either show, or hide, crowd-sourced annotations. Similarly, the configuration may allow the shopper to otherwise specify the types of annotations that are to be revealed or hidden, and other conditions, e.g., limiting them in number, by subject matter (don't bother me with coupons), source (don't show me stuff from national advertisers unless they pay me at least a dime in checkout credit for each impression), etc.

A Google Glass-wearing shopper scanning store shelves may configure the system to overlay faces on products recommended by those friends. Another may configure it to overlay faces on products that have merely been purchased by friends. Still another may configure the software to graphically flag those products that have been reviewed negatively by a friend.

And such shopper preference information is not limited to treatment of crowd-sourced and social information. Shopper Geoff may indicate to the software that he is not interested in coupons; Shopper Ed may show—by repeated inaction—that he is not interested in recipes. Accordingly, the annotations presented to these users can be tuned to conform to their expressed or implied preferences.

Some crowd-sourced annotations are made by existing social network infrastructure—without any hosting by a brand or store. An example is when a consumer selects a Twitter augmentation presented for a product. This augmentation causes the user's device to load the Twitter app, and start authoring a tweet with a hashtag indicating the product (e.g., #Wheaties). The user can then author a comment about the product and post it with a few further keystrokes. (This functionality can additionally, or alternatively, present the tweets of others that relate to the product.)

It will be recognized that some of the noted augmentations are not thematically tied to any particular feature on the packaging, but rather to the product itself (i.e., the stuff inside the packaging). Such augmentations may be functionally mapped to the headline name/logo, or they may be generally linked to the package as a whole, i.e., globally. For example, tapping or otherwise selecting the displayed product at a location not occupied by an augmentation/bubble, can trigger presentation of such globally-linked information.

It will further be recognized that some products don't have well-defined features that can be spatially-mapped, and to which different annotations can be anchored. Examples abound in the fruit and vegetable world, e.g., fresh lettuce. Nonetheless, such products can be recognized using known pattern recognition techniques. (See, e.g., Rocha, et al, Automatic fruit and vegetable classification from images, Computers and Electronics in Agriculture 70.1, pp. 96-104, 2010; and Dubey, et al, Species and variety detection of fruits and vegetables from images, International Journal of Applied Pattern Recognition 1.1, pp. 108-126 (2013), as well as published patent application 20130308045 and application 61/907,362, filed Nov. 21, 2013.) Once recognized, corresponding augmentations can be identified and presented.

One class of bubble with which all objects can be equipped is a "live assistance" bubble. When a user selects this option (e.g., by tapping on an augmentation), a communication channel is initiated with the customer service department of the company that produced, or distributed, the object. The user can then present—by text or voice or live video—whatever question or other matter needs attention (e.g., questions about food ingredients, warranty and return information, product instructions, etc.). The customer service representative responds as appropriate, again by text or voice or live video.

Back to initial authoring of a product experience, it is expected that the creative process will include extensive focus group testing of various augmentation alternatives. (Do you prefer this video of Phelps pulling away from his arch-rival during the race, or this other video of him after finishing, and seeing his record-breaking time on the race clock?) Each demographically-tuned augmentation can also be A/B tested. (For the 30-40 year old set, are you more interested to hear that whole wheat might help avoid heart disease, or might help you lose weight? For the 50-60 year old set, is avoiding stroke more important than avoiding type 2 diabetes? Etc.) If satisfaction metrics aren't high enough, new or additional design resources may be called-in to revamp the experience. Eventually, a pre-live version will pass tentative muster, and be presented for sign-off by brand executives and perhaps Corporate Management.

When the product experience finally goes live, campaign management tools enable the brand to quickly make post-introduction changes as they are required, e.g., when new celebrity endorsements are made, or when a new university study shows that a diet high in whole grains helps reduce the risk of Alzheimer's Disease. Back to re-write goes the design, with creatives revising the augmentations to tout the latest findings—perhaps with more rounds of focus-group testing to assure maximum efficacy. The daily news cycle invades brand management, triggering daily revisions to selected product experiences in response to the tides of trending media.

And once the product experience goes live, large scale A-B testing can be done with active sampling. Safeway stores in Peoria, Ill. and Albany, N.Y. can trial product campaign A for a given package, and stores in Greensboro, N.C. and Santa Barbara Calif. can trial an alternate campaign B. A week later, the augmentations can be reprogrammed to swap campaigns. The results from these normative cities can then be compared. If campaign A yields 8% more sales, then program augmentations nationwide can be programmed that way.

As noted, when a product goes live in stores, retailers may define their own experiences around the packaging—sometimes using the same functional mappings as the brand owner, and sometimes with their own custom augmentations.

Consider the Nutrition Facts panel on the cereal box. When a shopper using the Safeway app selects the Nutrition Facts feature on the box, the annotation may trigger a software module that is defined (or customized) by Safeway to compare the Wheaties nutrition information—line by line—with other cereals on the shelf. The software UI may present the other cereals in an order matching their physical placement on the Safeway shelf. If the Wheaties is shelved next to Post's Fruity Pebbles, which is shelved next to Kellogg's Frosted Flakes, then the user may make a sideways swiping gesture to compare the Wheaties data first with the Fruity Pebbles data, and then with a further swipe, with the Frosted Flakes data. The Wheaties data remains static, allowing the user to successively compare its nutritional information with each successive product along the shelf. Swiping in the other direction explores the shelf in the other direction. The user can swipe up or down to move to the shelf above or below, and continue in similar fashion with other cereals.

A shopper in the Kroger store down the street may use the Kroger app and find it augments the Nutrition Facts panel of the Wheaties box similarly, but with a comparison UI that is customized to Krogers' particular shelf layout.

Figure 7:
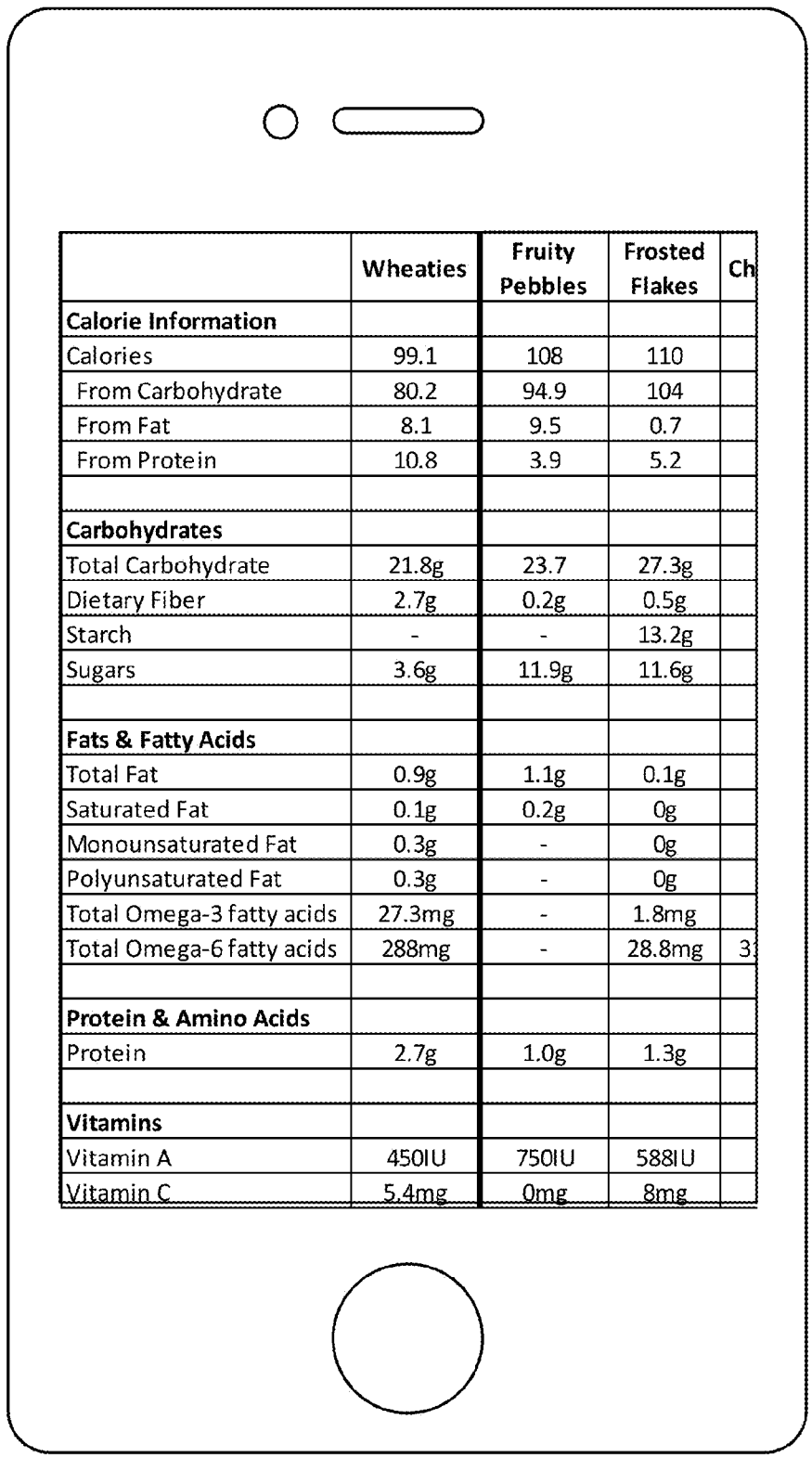
FIGS. 7 and 8 show views of exemplary nutrition-comparison applications.

An example embodiment for a smartphone, according to the just-described arrangement, is shown in FIG. 7. The left-most column of data, detailing Wheaties nutrition information, is fixed (and was established, e.g., by a user gesture selecting Wheaties cereal as the base product against which others are to be compared). The Fruity Pebbles, Frosted Flakes, and Cheerios (partial) columns to the right, correspond to placement of those products to the right of the Wheaties cereal on the store shelf. If, in contrast, the shopper moved the smartphone to the left (e.g., as sensed by accelerometers in the device), the Wheaties column of nutrition information would be presented on the right of the display, with nutrition for neighboring products to the left detailed in successive columns to the left.

It will be recognized that the nutrition information detailed in this presentation is more complete than that provided on the cereal box (e.g., figures are given for omega-3 and omega-6 fatty acids, while such information is not provided in the FIG. 4A information). Such information is available from various web sources, including the web site at nutritiondata<dot>self<dot>com. A great deal of further data is available to the shopper by scrolling down from the detailed screen of information (e.g., revealing vitamin and mineral information, etc.).

Figure 8:
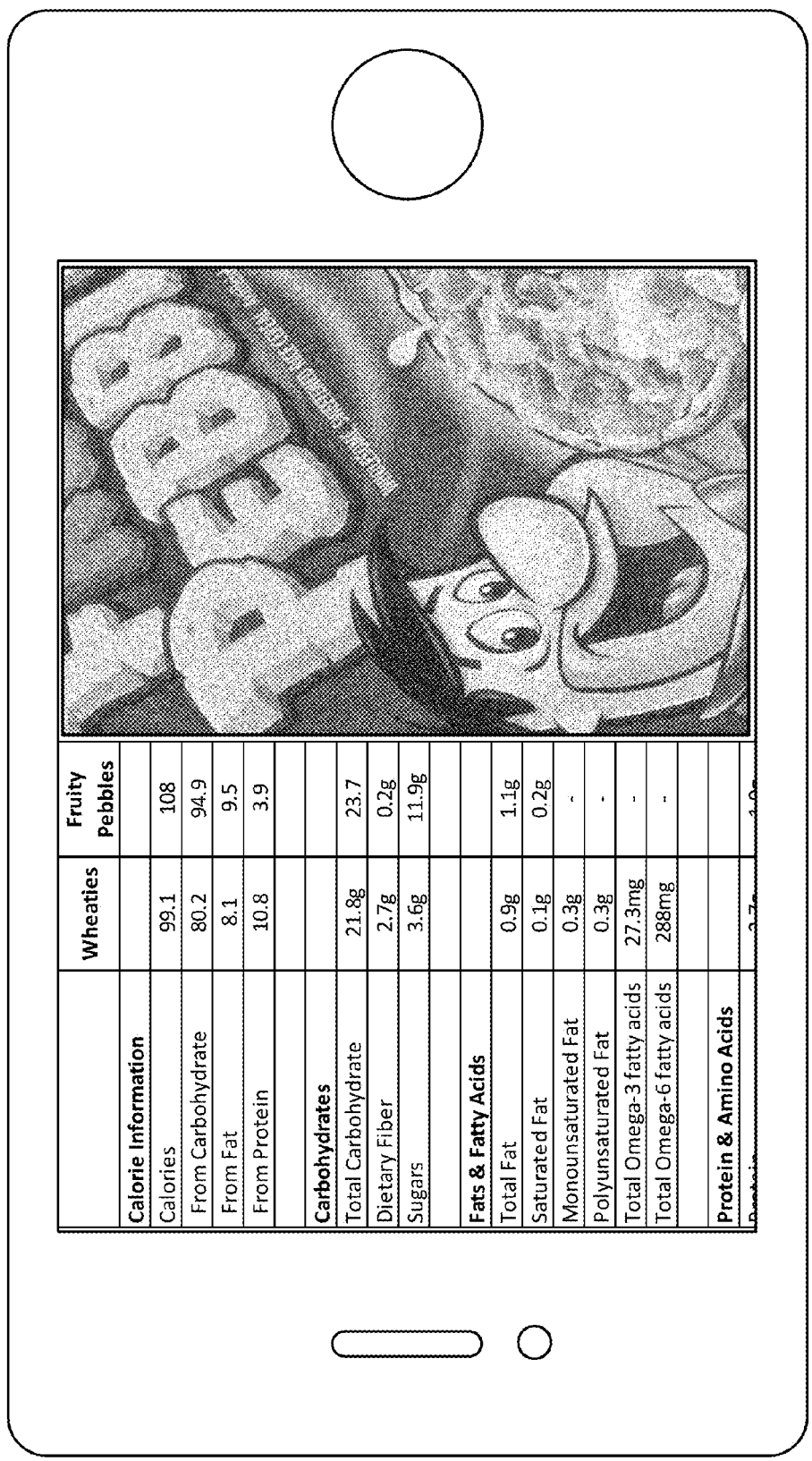

In an alternative embodiment, the Wheaties cereal selected by the user is compared against a cereal imaged by the device camera—without regard to shelf ordering. Such an arrangement is shown in FIG. 8 (in which the right side of the screen serves as a viewfinder for the smartphone camera, and the left side of the screen compares Wheaties nutrition with that of the cereal depicted).

Each retailer's augmentations can be stored in a digital asset management system maintained by that retailer. The retailer's app consults that repository for augmentations first, and then checks repositories where other augmentations may be found, e.g., a brand's DAM system, in accordance with the stored rules—successively examining many repositories until augmentation information is found.

If the retailer does not provide its own augmentation for the Nutrition Facts feature, the rules for that store's app may invoke the augmentation defined by the brand. This brand-programmed augmentation may similarly compare nutrition data for different cereals, but be limited to General Mills cereals (or only Wheaties vs. its competitors' cereals)—not tied to any store shelf layout.

Retailers may offer shoppers enticements to induce them to contribute product reviews, and then store such information in a proprietary database—rather than in an open data structure. Thus, reviews contributed by shoppers using the Safeway app may not be available to shoppers down the street at Kroger's, even if the Safeway app is used inside Kroger's. (The Safeway app may consult a database that is accessible only to users connected to the Safeway WiFi network.)

The retailers' augmentations can make use of data about the shopper's purchase history at that store—allowing finer customization of the augmentations to the user's particular circumstances. For example, Heinz may define an augmentation for its 12 ounce catsup bottle that provides a cents-off cross-promotion for its 12 ounce size of companion Heinz mustard. But if the retailer knows the shopper just bought a quart of mustard the day before yesterday, and knows that the shopper is fond of gourmet sausages, and knows the shopper buys only whole grain breads, the retailer may instead use an augmentation triggered from the Heinz catsup bottle to promote its whole grain hotdog buns.

Sometimes a retailer may provide augmentation for CPG hotspots for which the brand provides nothing, to introduce gamification aspects into the chore of shopping. Kroger supermarket, for example, may augment selected instances of the letter "K" on product packaging with a 50 cent credit at checkout. The rear of the depicted Wheaties box, for example, includes narrative text, "American swimmers have long been known for their success in the pool . . . " If a shopper images the letter "k" in "known," within a viewing angle of 10 degrees, Kroger supermarkets may issue a 50 cent checkout credit. The controlling software can limit the number of credits a shopper receives per week, e.g., to five, and may permit a credit from a particular product, e.g., Wheaties, only once in that period. Only 15% of the "K"s in the store may yield the reward, and they may be shuffled/re-selected every 5 minutes, to limit gaming of the system.

From the foregoing, it will be seen that packaging augmentations are desirably live and adaptable, not fixed and static.

For such adaptability to be employed for maximum benefit, active management of consumer packaged goods also requires active feedback about user interactions Thus, in accordance with another aspect of the technology, dashboard software is provided for use by brands and retailers, by which they can explore user interactions with different augmentations under their control. Hourly, daily, and weekly analyses may be available—identifying what bubble selections were made by consumers for given products. A list of stores in which user interactions with particular product(s) are occurring at that instant may also be presented. For brands, the information can be segmented by state, metropolitan media market, retailer, etc. Although the brands may not have information about particular shoppers, the activities of a particular shopper within a store may be discerned, e.g., by a phone hardware identifier that is transmitted as part of the data exchange when an augmentation is triggered. By such information General Mills may learn that, of the Oregon customers who interacted with its Cascadian Farms organic products, 1.4% also interacted with its Cheerios brand cereals, but only 1.1% interacted with its Total brand cereals. In Ohio the numbers are reversed. (It seems the Total brand needs additional promotion among organic consumers in Oregon.)

For retailers—with their greater information about customers—the data can be segmented by age, gender, residence zip code, etc. Importantly, the analyses can extend beyond a particular brand family, to all merchandise stocked by the retailer. Also, correlations with shopping history data can be performed. Thus, a Safeway store may find that, of the women age 18-25 who interact with cartons of fat-free milk, those who routinely redeem newspaper coupons (i.e., 28% of such women) end up buying Post brand cereals in 2.1% of their store visits, and buying Natures Valley cereals in 2.4% of their visits. In contrast, for those who never redeem newspaper coupons (i.e., the other 72%), such women end up buying Post brand cereals in 1.5% of their store visits, and buying Natures Valley cereals in 1.3% of their visits. Safeway knows that it publishes equal numbers of coupons for both Post and Natures Valley cereals in the local newspaper, but that its profit margin is 23% higher on Natures Valley products. With some MBA quantitative modeling, Safeway determines that it should direct 12% of its newspaper spend on Natures Valley coupons to other forms of media promotion that might be more visible to the demographic of weight-conscious 18-25 year old females. A week later, after taking advantage of a co-op advertising program offered by Natures Valley, in which the brand pays 90% of up to $5,000 in local television ad spending, the dashboard reports that the change has been successful—the numbers have shifted and profits are up.

A primary metric by which augmentations will be judged is "what rings the cash register." Retailers have the advantage of a tight feedback loop—they can revise a product's augmentations in the morning, and check POS data at the end of the day to see if any statistically significant change occurred. Brands typically don't have such immediate visibility into results, but can still tune augmentations to enhance shopper responses—just with a longer loop time.

Online retailers, such as Amazon, can identify (e.g., from page-view data) products that a shopper looked-at but did not buy. This information can be used to highlight areas for improvement, e.g., enhancing the product description, lowering the price, etc. Brick and mortar retailers have lacked this capability. But the present technology can be used to extend this insight about almost-made-sales into brick and mortar stores. If 60% of consumer interactions with nutrition panels on cereal boxes lead to purchases of the examined products, but Wheaties is found to lag in this regard with a 30% statistic, then General Mills (or the store) is alerted to a notable deficiency where improvement is needed. Responsive action—in pricing, product formulation, marketing, or otherwise—can be investigated and pursued.

From the foregoing, it will be evident that shopper interactions with CPG augmentations serve as a probe into shopper sentiment, by which brands and retailers can adapt their strategies.

A further aspect of the technology is putting product augmentations out to bid—providing opportunities to communicate with potential consumers to whatever parties value such opportunities the highest.

General Mills isn't likely to offer Kellogg's the chance to define an augmentation for its front panel Wheaties logo, but it might offer a local milk vendor, or a regional newspaper, a chance to define an augmentation elsewhere on the Wheaties box. What's it worth to them? Product profit needn't come only from sales of physical product—higher profit margins can come from licensing augmentation space.

When a shopper's camera initially recognizes the box of Wheaties, even before the system starts sending responsive information (e.g., 3D model data) to the shopper's device, it alerts an ad network about the availability of a live shopper who will doubtless soon be at a checkout—wallet in hand. Many advertisers would like to make an impression at this propitious moment.

With this notification, the system also makes available relevant context information. This includes demographic profile information about the user, history information about products with which the user has previously interacted (during that store visit, or otherwise), information identifying the previous augmentations that prompted the shopper to action, information about the user's location, etc. Cookie data on the shopper's portable device can allow access to a dossier of information about the shopper's online activities (and sometimes offline as well, as detailed in application Ser. No. 14/098,971, filed Dec. 6, 2013). The more the ad network knows about the shopper, the more targeted the advertisers' promotions can be, and the more money the advertisers will pay to make an impression.

Still richer information may be available from the retailer's database, e.g., indicating the shopper's past purchases, frequency of visiting the store, etc. Depending on the particular implementation, such information can be made available to the ad network as well (always subject to appropriate privacy safeguards).

In a blink of an eye, the ad network has evaluated competing offers from parties wanting to present an advertising impression to the shopper, and has caused data for one or more winning augmentations to be sent to the shopper device for display. Such augmentation may be mapped to a particular feature on the product, and probably shown only when that feature of the product is depicted on the user device display. More commonly, the augmentation is not tied to a particular feature, but is shown for as long as the product is depicted on the shopper's display.

The commercial augmentation may appear as a banner promotion, or scrolling text, across the bottom of a display screen, and may invite the user to take some action in exchange for a reward. For the Wheaties example, one such promotion may invite the user to make a gesture (e.g., tap a smartphone touch screen) to receive a 25 cent credit off any half-gallon of Alpenrose brand milk purchased while in the store. Another promotion may invite the shopper to watch a promotional 20 second video in exchange for a 50 cent credit at checkout. Or the commercial augmentation may, itself, automatically launch such a video in a corner of the display screen. The shopper isn't informed in advance as to the length of the video, but if they tap the video within 2 seconds of its conclusion, the shopper is granted a dollar credit at checkout.

In contrast to the foregoing, sometimes a brand may chose not to sell product augmentation opportunities. Instead, it may offer to pay others to provide a desired augmentation—particularly if it might help sell more products.

Gatorade, for example, might pay ESPN for the right to present a video clip of that day's Top Ten Plays as an augmentation on its bottled drinks. Gatorade markets itself as a drink for athletic competitors, and affiliating itself with top sports plays may be a prudent marketing campaign. Whenever a shopper images a Gatorade bottle with a camera, the shopper is presented with a rendering of that day's Top Ten Plays clip. (The user might operate a UI control to expand the rendering from part-screen to full-screen.) Packages become virtual extensions of display screens.

If a particular user routinely selects the ESPN augmentation when viewing a Gatorade bottle, then the system can learn to auto-launch this augmentation each time a Gatorade bottle comes into view—without requiring any action by the user.

Sometimes high profile sporting events are embargoed from free network broadcast for a period of hours, in accordance with contract terms. Some Olympic events that took place in London, for example, were embargoed for broadcast in the US, so that NBC could present them during (US) evening prime time, when the network was able to charge higher rates to advertisers. During the period before sports coverage is freely available, such content can serve as valuable augmentation for brands who want to appeal to consumers interested in the embargoed content. (E.g., Coke may invite fans of Olympic diving to interact with a Coke can, and see highlights from Olympic diving events that just concluded, but that won't be seen on broadcast for several more hours.)

Some of the above augmentations are tailored for in-store presentation (e.g., cents-off coupons and check-out credits). Other augmentations are suitable at any time (e.g., sporting clips). Thus, a shopper who buys a six-pack of Gatorade may be able to see the day's Top Ten Plays on ESPN, simply by opening the home refrigerator, and viewing a bottle.

(Augmentations that are tailored for in-store presentation can be swapped with other augmentations, for interactions after a product leaves the store. Location information from the user device permits the system to determine which augmentation to render.)

Speaking of location, it may be recognized that a product may serve as a beacon that signals location. Store layouts are well-defined—often specified by carefully crafted "planograms" that detail what products are placed at what locations. If a user's camera senses a box of Tide detergent, it can be determined that the user is in aisle 6, about 40 feet from the north end of the store. Counterpart latitude/longitude coordinates can also be provided. This location information can be used in providing known location-based-services and promotions to the user. (A similar outcome can be achieved by using an olfactory sensor rather than an image sensor, e.g., signaling that the user is near the cologne counter at Macy's.)

Applicant's published and pending applications, including 20110212717, 20110161076, Ser. No. 14/098,971, filed Dec. 6, 2013 (now published as 20140164111), and Ser. No. 13/892,079, filed May 10, 2013 (now published as 20140164124), provide more information relating to the foregoing, including auctioning on-screen augmentation opportunities, use of location and other context in ad presentation, and crowd-sourcing auxiliary content identified by consumers.

In another aspect, the present technology provides virtual communities organized around objects, such as CPGs. Just as each package has a database record where associated information is compiled, the package may have a web address—around which social interactions can occur and where data related to the product can be stored. The internet name space may provide a dedicated top level domain (e.g., .object) for this purpose. An object may have a short, arbitrary address (e.g., 8Kw97G2.object) or a semantically-expressive address can be used (e.g., Wheaties_Michael_Phelps.object). Or the latter can be used by humans, and can operate simply to redirect the user to the former.

Persons interested in the Wheaties product can link to this web resource by interacting with a physical box, either at the supermarket or at home. A portal to this web location can be one of the augmentations that may be selected when the box is sensed by a user device camera. Alternatively, users can link to the site by interacting with an image of the product found elsewhere—such as on the web. For example, a right-click of a mouse, or a triple-tap on a touch-screen tablet, can link from a web page on which a picture of any object appears, to that object's web page. Or the user can navigate to the web location by a search aid, such as Google.

At the web site the user can find a variety of information relating to the product. By way of example, this information can include crowd-sourced product commentary, the textual information (e.g., Nutrition Facts) printed on the packaging, brand-authored promotions of the product (video commercials, etc.), links to other media in which the product appears (e.g., a Seinfeld episode in which Jason has Wheaties for breakfast), map data identifying brick and mortar retailers where the product can be purchased, augmentation data authored by the brand, by retailers, and/or by consumers, etc.

Browser software can present alternative views of this universe of product sites, e.g., arranged by manufacturer: General Mills, which has subsidiary nodes for baking products, cereals, dough/pastries, fruit, ice cream, etc., each of which has subsidiary nodes for different trademarked brands (Wheaties, Cheerios, Total, etc.), each of which may have subsidiary nodes (Honey Nut Cheerios, Frosted Cheerios, MultiGrain Cheerios, etc.). Or the browser may present the sites arranged by product types (e.g., with frozen, fresh, and packaged; then—for packaged—cookies, cereals, pastas, etc.)

Living Packages (and Recycling)

Actively Managed Packages are Living Packages. Living Packages are Intelligent Packages. Intelligent Packages know how to sell themselves, do so most cost effectively, and most of all, they know how to stay out of landfills. Consumers will choose Living Packages over one-time, dead end packages, while the purveyors of those packages will achieve better margins in the process. 7 Billion Consumers will demand no less, and yet again they will drive the economics swiftly toward Actively Managed Packages.

Recognizable symbols, both proprietary as well as universal (public domain), can be one of the underpinnings of a global shift towards much more efficient and successful forms of packaging goods. Gary Anderson's now-familiar Recycling Arrows (http://en<dot>wikipedia<dot>org/wiki/Recycling_symbol) will inspire new forms of Living Package symbologies and icons. Anderson's work was prompted by a competition sponsored by Container Corporation of America. Companies today are even more interested in reducing their ecological footprints, and are still more interested in being seen as leaders in the green revolution. This, coupled with contemporary consumers' green emphases and their connected consumption practices, sets the stage for fundamental changes in how 7 Billion people treat our mutual home and its human-material flows. The present technology can play a role.

Figure 9:
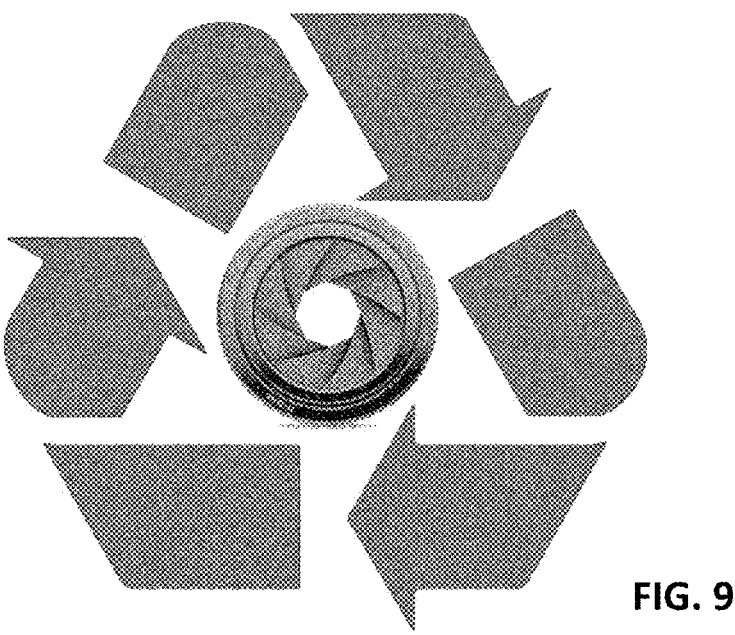
FIG. 9 shows an illustrative symbol to denote a Living Package.

Actively Managed Packages—ones that magically come alive and offer assistance while the ever-more-wired world simply views them—have the opportunity and the responsibility to advance the culture (and lower the cost) of package-based consumption. FIG. 9 present some thematic notions of what type of graphic treatments might be possible for consolidated symbology, for iconic representations of yet another consumer shift toward better habits—indicating a visual portal into the world of product recycling.

As with the 1970-era recycle triangles, a whole host of opportunities masquerading as challenges show up in this largely graphic exercise. The original triangles immediately had to cope with the continuum and nuances of what it actually meant to "recycle." Is this chicken manure just going back out into the field, or is there some notional monolithic government program ingesting this object, and lickety-split that same material—after some cleaning we hope—is back packaging up the next version of the consumable Good? This last sentence is deliberately obscure, aiming to underscore the immediate challenges that were represented by a bewildering array of paper types; paper versus non-paper, e.g. aluminum cans vs. non-aluminum . . . on and on. The debate was on not just about the details of how the arrows themselves should be rendered (and their obscure Mobius-ness), but specifically how various treatments of "the symbol" could begin to assist in the understanding of the type of recycling intended . . . we could even call it the pre-curser of trying to communicate "which dang bin do I put this thing in?"

With Actively Managed Packaging, the options for exploiting these symbology opportunities for consumer education immediately mushroom, compared to the early 70's opportunities, which by and large were limited to graphic treatments on packages and on advertisements dealing with the recycling movement. The main stem of that mushroom is the very core of "active management": cloud content, including live human assistance, can attach and evolve with that package. The graphically presented symbology on the Living Package, whatever its form may take, is the gateway to rich content of the "recycling and re-use" variety. Don't know which bin to throw this thing in? . . . Ask the thing itself.

Back to hard core capitalism, shareholders, return on investment and the like, what's the deal here? The deal couldn't be simpler, summarized by two cerebral points, and punctuated by a third common sense point.

Cerebral point 1 is that given an otherwise equal choice, a vast majority of consumers will choose a responsible option over a dead-end option. Maybe not everyone, but sales numbers will bear this out—not predictions in a patent application. Leading to cerebral point 2: the raw material and manufacturing costs for packages, which are designed and engineered within a more diverse supply space of materials themselves, will eventually be lower than "extract and discard" approaches. Said another way, this generation of packaging designers and engineers, given the appropriate and the creatively solvable challenge of treating raw material flows as a cost-driven engine, will continue to evolve better material recycling ecosystems, where the hard expense numbers will be the proof in the pudding. Clearly, some cigar-munching Mr. Potter Capitalist can call BS on this second cerebral point, but good thing such folks are a dying breed. This is the segue sentence to the common sense point: it's just the right thing to do and we all know it.

Clearing the Mr. Potter hurdle then, the description can get back to the inventive details of highly deliberate interactive symbology on consumer packages . . . that symbology which people will know and expect to "come alive."

Review

A small sampling of the many inventive arrangements detailed in this specification are reviewed below:

One method involves rendering a visible model of a consumer packaged good from 3D model data stored in a user's portable device. User input is received, designating a sub-portion of the rendered model as being of user interest (e.g., the user is inspecting that portion of the model). A data structure remote from the portable device is consulted to identify an annotation associated with the designated sub-portion. This annotation is then presented to the user. (Fingerprint or watermark information can be derived from the designated sub-portion of the rendered model, to identify a location of that sub-portion, for which a corresponding annotation can be identified.)

Still another method involves displaying imagery of a 3D consumer packaged good, from a first perspective, on a display of a user's portable device. User input is received, designating a first sub-portion of the displayed good as being of user interest. A data structure is consulted to identify a first annotation associated with the designated first sub-portion, and this annotation is then presented to the user. (User input may also be received designating a second sub-portion of the displayed good as being of interest, and a corresponding second annotation—identified by consulting a data structure—can be presented to the user. One of these annotations may be established by a company that produced the consumer packaged good, and the other of these annotations may not have been established by that company—but rather by an individual, or by a retailer where the consumer packaged good is offered for sale.)

Yet another method includes receiving data indicating selection of a first sub-portion of a consumer packaged good by a user in a first store. This user is provided a first annotation that corresponds to this first sub-portion. Data is similarly received indicating selection of that same sub-portion of the consumer packaged good by a user in a second store. This user is provided a second annotation that corresponds to this first sub-portion—which is different than the first annotation. (The first annotation may have been established by an operator of the first store, and the second annotation may have been established by an operator of the second store.)

Another aspect of the technology involves receiving data indicating selection of a first sub-portion of a consumer packaged good by a first user in a first store. A first annotation that corresponds to this first sub-portion is provided to this first user. Data is also received indicating selection of this same first sub-portion of the consumer packaged good—this time by a second user in the first store. A second annotation corresponding to this first sub-portion is provided to this second user. These first and second annotations are different. (For example, the annotations may comprise nutritional information relating to the good, and the first and second annotations differ due to differing ages, weights, and/or genders of the first and second users. Or the annotations may differ because the second user has taken action leading to presentation of nutritional information from a source different than the United States government. Or the annotations may differ by reason of social network information associated with the second user.)

Another aspect of the technology generally concerns identifying plural different goods on a store shelf, and presenting a visual augmentation for each of these plural goods to a shopper.

These augmentations may indicate relative sales rankings for different of the goods, thereby indicating a best seller among the plural goods. Or the augmentations may indicate relative sales rankings for different of the goods among one or more of a shopper's social network friends, thereby indicating a best seller among these goods from among such friends. Or the augmentations may identify social network friends of the shopper who have purchased said goods. Etc.

A further method includes identifying a consumer packaged good on a store shelf, and presenting one or more visual augmentations for the good to a shopper, where one of these augmentations enables the shopper to communicate with a customer service representative for a company that produced or distributed said good.

Another method is similar, but the augmentation enables the user to determine recycling information related to said good.

Another method is also similar, but the augmentation serves to pre-fill—with an identification of the good—a posting to a social network account of the user, so that the user can more rapidly complete said posting. (E.g., the augmentation may begin to author a tweet, pre-filled with a hashtag corresponding to the good.)

Still another method includes capturing imagery depicting a consumer packaged good, using a first user's portable device. Input is received from the first user, designating a first sub-portion of the consumer packaged good depicted in the imagery. Annotation information is then received from the first user, concerning this designated sub-portion of the good—an annotation that this user wishes to make available to one or more other users. Information about this first sub-portion, and this annotation, are stored in a data structure. By such arrangement, the annotation is available from the data structure for presentation to a second user who designates a second sub-portion of the consumer packaged good, where the second sub-portion overlaps with the first sub-portion.

A further method includes identifying a first consumer packaged good (e.g., a box of Wheaties cereal), and presenting plural data elements about this first good (e.g., different nutrition data) to a shopper on a portable device display. A second consumer packaged good (e.g., a box of Fruity Pebbles cereal) is similarly identified, and plural data elements about this second good (corresponding nutrition data) are presented to the shopper on the display. The information is presented to facilitate comparison between comparable data elements for the first and second goods (e.g., as depicted in FIGS. 7 and 8).

Yet another method involves capturing multi-viewpoint imagery from a 3D package for a consumer good. Positions of plural digital watermark tiles in the captured imagery are identified (e.g., by analyzing the captured imagery using a hardware processor configured to perform such act). Package map information is generated that defines spatial correspondence between artwork on the package and the plural watermark tiles. This package map information is then provided to another party, enabling that party to author interactive experiences based on different views of the package.

Another aspect of the technology concerns capturing imagery depicting package artwork from a 3D package of consumer goods, by resting the package on a turntable and rotating the turntable so that imagery from plural different viewpoints is captured. This captured imagery is processed (e.g., by a hardware processor) to discern locations and payloads of tiled steganographic watermarks encoded in the package artwork. Resolution information—including at least some of the captured imagery, and data about the discerned locations and payloads—is stored in a repository. By such arrangement, a package-based interactive experience can be authored by reference to a perceptible feature of the artwork, and then re-mapped, using the stored information, to refer to an imperceptible, watermark tile-based feature of the artwork.

A further method involves capturing imagery of an object using a camera-equipped portable device. By reference to information derived from the captured imagery, 3D model information for the object is obtained from a data store. Different views based on the 3D model information are then rendered to a user, responsive to navigation input received from the user. These rendered views are augmented by presenting plural annotations. In particular, a first annotation—but not a second annotation—is presented when the user navigates to a first view, and a second annotation—but not the first annotation—is presented when the user navigates to a second view. (The first annotation can depend on user context—such as location.)

Another aspect of the present technology concerns a non-transitory computer readable medium containing a data structure that plural layers of information associated with a consumer packaged good. These layers of information include at least three from the list: a layer of information detailing a visible ink pattern; a layer of information detailing a steganographic digital watermark pattern; a layer of information detailing scale-invariant feature points; a layer of information detailing a glue pattern; a layer of information detailing 3D model information; a layer of information detailing vendor information; a layer of information detailing a vendor's ink identifier; and a layer of information detailing an augmentation to be presented with a view of the consumer packaged good. Information on these layers may have been contributed by different parties, at different times. Some of the information may have been transferred from origination materials authored by a software tool, and other of the information may have been captured from a physical sample of the consumer packaged good.

Another method involves publicizing a game, in which participants are rewarded for interacting with retail products in a store. A prize-winning interaction is then determined (or confirmed) by reference to imagery captured by a participant's portable device. For example, the game may involve imaging certain letters or words found on product packaging.

A further method includes receiving information about plural URLs, each dedicated to a respective retail product. Responsive to first user input, a first view based on the received information is presented, in which the information is primarily classified by product producer, rather than product type. Responsive to other user input, a second view based on this received information is presented, in which the information is primarily classified by product type rather than product producer.

One method involves an on-screen display of differently-oriented views of a product (e.g., a consumer packaged good). When the product is displayed at a first orientation, the on-screen display is augmented with an annotation that is associated with a first feature on the product, and is positioned to the right of the displayed product. When the product is displayed at a second orientation, the display is again augmented with an annotation associated with the first feature, but now positioned to the left of the displayed product. When the product is displayed at a third orientation, the product is displayed without the annotation—even though the first feature of the product is visible in the on-screen display of the product when at the third orientation.

Another method also involves on-screen display of differently-oriented views of an object. This object includes first and second features on a common planar face. The method includes augmenting the on-screen display with a first annotation associated with the first feature, and with a second annotation associated with the second feature. When the object is displayed at a first orientation, both the first and second annotations are presented to the right of the displayed object. When the object is displayed at a second orientation, both the first and second annotations are presented to the left of the displayed object. But when the object is displayed at an orientation between the first and second orientations, the first annotation is presented to the right of the displayed object, and the second annotation is presented to the left of the displayed object.

Yet another method also involves an on-screen display of differently-oriented views of an object. Information indicating an orientation at which the displayed object is viewed is determined. This information is compared with stored reference information, using a hardware processor configured to perform such act. Based on a result of the comparison, the on-screen display is augmented by presenting an annotation. Thus, the presentation of the annotation depends both on the determined orientation information, and also on stored reference information.

Still another method involves displaying a product with a face at a first orientation, and augmenting the display with an annotation that is associated with a first feature on the product. When the product is displayed with the face at a second orientation—with the first feature again visible, displaying the product without the annotation. The annotation is not displayed in the latter case because an angle between a surface normal from said face and a viewing direction is outside of a permitted range.

A further method concerns an on-screen display of a product having plural features, and includes augmenting the display by presenting an annotation associated with a first of said features, and controlling the presentation based on spatial position of a second of the features, where the first and second features are located at different positions (e.g., different planar surface) on the product.

Still another aspect of the technology concerns imaging a consumer packaged good (e.g., a drink bottle) with a camera in a user's portable device, and in response, presenting a clip of video sports to the user on a display of said portable device. (This clip may be one that is not, and has not been, available on broadcast media, at the time of its presentation to the user.)

Concluding Remarks

Having described and illustrated the principles of our inventive work with reference to illustrative examples, it will be recognized that the technology is not so limited.

For example, while the detailed embodiments contemplated that augmentations would be presented on a user device display, this need not be the case. For example, when a user taps the Nutrition bubble 14a presented on a mobile phone display in FIG. 1B, responsive graphic information may be pushed to a larger format display screen near the user (e.g., as determined by known location-based-service methods).

While FIG. 6 suggests a simple database record, more elaborate data structures will likely be used in actual practice. This may include federated data structures—employing information stored at different locations by different parties. Some of the information may be stored at a URL dedicated to the product (e.g., at a top-level.object address). Other information may be stored in a Creative Commons database. Still other information may be stored in a proprietary database over which General Mills has control (unlike the previous two).

In the future, it is expected that consumer packaged goods will be serialized. That is, it will be possible to digitally distinguish one box of Wheaties from a seemingly-identical box. (Patent application 61/913,012, filed Dec. 6, 2013, details one such arrangement—employing plural watermarks in tiled arrangement—with the spatial relationship between the tiles varying from box to box as a consequence of the printing process. RFID chips—sometimes termed NFC chips—could allow such functionality to be achieved now, albeit at a significantly greater cost.) Such item serialization will allow retailers to track particular instances of goods as they are purchased at check-out terminals. In such arrangements, when an item is purchased, an entry can be made in a database. This entry can cause an augmentation for the item to change, or an augmentation to be enabled. For example, the viewing of ESPN sports programming from Gatorade bottles may be enabled only after a shopper has purchased the bottle. A different payoff may be provided if the shopper interacts with the bottle while it is still on the store shelf.

While reference was made to app software on a smartphone that performs certain of the detailed functionality, in other embodiments these functions can naturally be performed otherwise—including by operating system software on a smartphone, by a server at a social networking service, by another smartphone or computer device, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of fingerprint and watermark information from imagery is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of audio, image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv:1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to patent application 61/861,931, filed Aug. 2, 2013.

Various references were made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds, recognized speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then user or device actions (e.g., writing, talking, reading, searching, navigating, pointing), then proximities (e.g., to people, vehicles, buildings, perimeters, jurisdictions, other devices), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

While many of the illustrative embodiments made reference to digital watermarking for content identification, in most instances fingerprint-based content identification (i.e., recognition of inherent, rather than added, patterns) can be used instead.

The techniques of digital watermarking are presumed to be familiar to the artisan. Examples are detailed, e.g., in Digimarc's patent documents U.S. Pat. Nos. 6,614,914, 6,590,996, 6,122,403, 20100150434 and 20110274310, as well as in application Ser. No. 13/946,968, filed Jul. 19, 2013 (now published as 20140052555), and 61/909,989, filed Nov. 27, 2013. Such watermarks are commonly imperceptible, meaning they are not noticeable to a viewer examining watermarked packaging from a typical viewing distance (e.g., 20 inches). Spot colors, as are sometimes found on packaging, can be watermarked by leaving tiny voids in the printing to subtly change the luminance or chrominance. Other techniques for watermarking of spot colors are detailed in U.S. Pat. No. 6,763,124 and application Ser. No. 13/975,919, filed Aug. 26, 2013 (now U.S. Pat. No. 9,449,357).

Fingerprint-based content identification techniques are also well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.)

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Optical character recognition (OCR) can be similarly employed to identify objects, and can also serve to provide anchor points to which annotations may be spatially referenced.

Use of such identification technologies to obtain object-related metadata is familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's U.S. Pat. Nos. 6,947,571 and 7,206,820.

Applicant's other work that is relevant to the present technology includes that detailed in patent application Ser. No. 13/651,182, filed Oct. 12, 2012 (now published as 20140106710), Ser. No. 13/789,126, filed Mar. 7, 2013 (now published as 20140119593), Ser. No. 13/892,079, filed May 10, 2013 (now published as 20140164124), 61/838,165, filed Jun. 21, 2013, and Ser. No. 14/074,072, filed Nov. 7, 2013 (now published as 20140258110), and published applications 20100228632, 20120218444, 20120046071, 20120300974, 20120224743, 20120214515, 20130097630, 20130311329, 20130314541.

Some of the third party work that is relevant to the present technology includes that detailed in published applications 20130250048, 20130290106, 20130246182, 20120215640, 20120233003, 20130127980 and 20070106721.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect.

Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A method involving an on-screen display of differently-oriented views of a 3D product captured by a camera of a user's mobile device, the method comprising the acts:
   receiving a first camera-captured view of the 3D product, captured when the product has a first pose relative to the camera, said first camera-captured view depicting the 3D product at a first orientation; and augmenting display of said first view on a screen of the user's mobile device with an annotation, the annotation being associated with a first anchoring feature on the 3D product, the anchoring feature being a particular location within a face of the product depicted in the first view, the annotation being positioned to the right of the displayed 3D product on said screen;
   receiving a second camera-captured view of the 3D product, captured when the product has a second pose relative to the camera, said second camera-captured view depicting the 3D product at a second orientation and again depicting said first anchoring feature; and augmenting display of said second view on the screen of the user's mobile device with said annotation, said annotation still being associated with said first anchoring feature, but being positioned to the left of the displayed 3D product on said screen, the annotation thus moving from the right side of the displayed 3D product to the left side; and
   receiving a third camera-captured view of the 3D product, captured when the product has a third pose relative to the camera, said third camera-captured view depicting the 3D product at a third orientation and again depicting said first anchoring feature; and displaying the third view on the screen of the user's mobile device without said annotation, despite depiction of said first anchoring feature in said third camera-captured view;
   wherein varying presentation of the annotation with variations in product-camera pose helps serve the function of drawing the user's attention to the annotation.

2. The method of claim 1 that includes sensing said first and second orientations by analyzing image data depicting said product, using a hardware processor configured to perform such act.

3. The method of claim 1 in which the annotation is spatially associated with the first anchoring feature on the product.

4. The method of claim 1 in which the product includes a first face comprising said first anchoring feature, and the method includes:
   when the product is displayed with the first face oriented within a threshold angular value of a viewpoint, augmenting the on-screen display with said annotation; and
   when the product is displayed with the first face oriented outside said threshold angular value, displaying the product without said annotation;
   wherein the annotation disappears when the first face is turned away from the viewpoint.

5. The method of claim 1 wherein the product comprises a retail package box.

6. A method involving an on-screen display of differently-oriented views of a 3D object that includes first and second anchoring features on a common planar face, each of said anchoring features being a particular location within said face of the 3D object, the method comprising the acts:
   augmenting the on-screen display with a first annotation associated with the first anchoring feature, and with a second annotation associated with the second anchoring feature, while the orientation of the 3D object relative to the camera is varied between first, second and third orientations, wherein:
   when the object is displayed at the first orientation, presenting both the first and second annotations to the right of the displayed 3D object;
   when the object is displayed at the second orientation, presenting both the first and second annotations to the left of the displayed object, the annotations thus moving from the right side of the displayed 3D product to the left side; and
   when the object is displayed at the third orientation, which is between the first and second orientations, presenting the first annotation to the right of the displayed object, and presenting the second annotation to the left of the displayed object;
   wherein varying presentation of the first and second annotations with variations in object-camera orientation helps serve the function of drawing the user's attention to the annotations.

7. The method of claim 6 wherein the object comprises a retail package box.

8. The method of claim 6 that includes sensing said first and second orientations by analyzing image data depicting said object, using a hardware processor configured to perform such act.

9. A method involving an on-screen display of differently-oriented views of a 3D object having a planar face, the method comprising the acts:
   determining orientation information indicating an orientation at which said face of the displayed 3D object is viewed;
   comparing said determined orientation information with stored reference information, using a hardware processor configured to perform such act, the stored reference information serving to specify a threshold angular value datum, said datum defining orientations at which an annotation should be rendered; and
   when said comparing has a first outcome, augmenting the on-screen display by presenting the annotation, and when said comparing has a second outcome, not augmenting the on-screen display with the annotation;
   wherein presentation of the annotation varies depending both on said determined orientation information, and on said threshold angular value datum, wherein such varying presentation helps serve the function of drawing a user's attention to the annotation; and
   wherein the annotation is associated with an anchoring feature on said planar face.

10. The method of claim 9 in which the object includes first and second features on a common planar face of the object, and the method includes:
    determining information indicating viewing orientations of the first and second features;
    comparing said determined information with stored first information for the first feature, and with stored second information for the second feature; and
    at a first time, based on a result of said comparing, augmenting the on-screen display by presenting a first annotation corresponding to the first feature, but not augmenting the on-screen display by presenting a second annotation corresponding to the second feature.

11. The method of claim 10 that includes, at a different time, with a differently-oriented view of the object:
    based on a result of said comparing, augmenting the on-screen display by presenting a first annotation corresponding to the first feature, and also augmenting the on-screen display by presenting a second annotation corresponding to the second feature.

12. The method of claim 9 wherein the object comprises a retail package box.

13. The method of claim 9 that includes sensing said first and second orientations by analyzing image data depicting said object, using a hardware processor configured to perform such act.

14. The method of claim 9 in which the object comprises a packaged food item, and the method further includes responding to user selection of the annotation by rendering a nutrition facts graphic on the screen, said rendering including a visual transition in which the annotation expands out from one of the corners of the display screen.

15. The method of claim 9 in which the object comprises a packaged food item that includes first and second features on a common planar face thereof, the first and second features having first and second annotations respectively associated therewith, the method further including:
    when said face is viewed at a first orientation, presenting neither the first nor second annotations as augmentations on the display;
    when said face is viewed at a second orientation, presenting the first but not the second annotation as an augmentation on the display; and
    when said face is viewed at a third orientation, presenting both the first and second annotations on the display.

16. The method of claim 9 in which the object comprises a packaged food item that includes first and second features on a common planar face thereof, the first and second features having first and second annotations respectively associated therewith, the method further including:
    when said face is viewed at a first orientation, presenting both the first and second annotations on a same side of the displayed object on the display screen; and
    when said face is viewed at a second orientation, presenting the first annotation to the right side of the displayed object on the display screen, and presenting the second annotation to the left side of the displayed object on the display screen.

17. The method of claim 9 in which the object comprises a packaged food item having a planar face, and the annotation is associated with an anchoring feature on said planar face, the anchoring feature being defined using a steganographic reference system comprising plural tiles.

18. The method of claim 9 that further includes capturing imagery of said object with differently-oriented views with a head-mounted camera system worn by the user.

19. The method of claim 9 that further includes the acts:
    recognizing the object from imagery thereof captured by a camera conveyed by the user;
    obtaining different images of the recognized object from a remote computer system, said different images of the recognized object having been authored by a third party different than said user; and
    presenting different of said images to the user in response to user input.

20. The method of claim 9 that further includes the acts:
    recognizing the object from imagery thereof captured by a camera conveyed by the user;
    obtaining 3D model information for the recognized product from a remote computer system, said 3D model having been authored by a third party different than said user; and
    presenting a rendering of the 3D model to the user on the screen.

* * * * *